(12) United States Patent
Cordella et al.

(10) Patent No.: US 10,102,390 B2
(45) Date of Patent: Oct. 16, 2018

(54) MEMORY AUTHENTICATION WITH REDUNDANT ENCRYPTION

(75) Inventors: Thomas Cordella, Tampa, FL (US); John Profumo, St. Petersburg, FL (US)

(73) Assignee: Honeywell International Inc., Morris Plains, NJ (US)

( * ) Notice: Subject to any disclaimer, the term of this patent is extended or adjusted under 35 U.S.C. 154(b) by 857 days.

(21) Appl. No.: 13/536,653

(22) Filed: Jun. 28, 2012

(65) Prior Publication Data

US 2014/0006797 A1    Jan. 2, 2014

(51) Int. Cl.
   *G06F 21/64* (2013.01)
   *G06F 21/62* (2013.01)
   *H04L 9/08* (2006.01)
   *G06F 12/14* (2006.01)

(52) U.S. Cl.
   CPC ...... *G06F 21/6209* (2013.01); *G06F 12/1408* (2013.01); *G06F 21/64* (2013.01); *H04L 9/0861* (2013.01)

(58) Field of Classification Search
   CPC ............... H04L 9/0861; G06F 12/1408; G06F 21/6209; G06F 21/64
   USPC ........................................................ 713/189
   See application file for complete search history.

(56) References Cited

U.S. PATENT DOCUMENTS

| | | |
|---|---|---|
| 5,058,164 A | 10/1991 | Elmer et al. |
| 5,987,572 A | 11/1999 | Weidner et al. |
| 6,075,858 A | 6/2000 | Schwartzman |
| 7,185,205 B2 | 2/2007 | Launchbury et al. |
| 7,305,084 B2 | 12/2007 | Hawkes et al. |
| 7,451,288 B2 | 11/2008 | Goettfert et al. |
| 7,519,830 B2 | 4/2009 | Mihm, Jr. et al. |
| 7,685,434 B2 | 3/2010 | Kaniz et al. |
| 7,912,223 B2 | 3/2011 | Osaki |
| 7,979,716 B2 | 7/2011 | Fiske |
| 8,001,374 B2 | 8/2011 | Wise |

(Continued)

OTHER PUBLICATIONS

Huo et al., "PEM: A Lightweight Program Memory Encryption Mechanism for Embedded Processor", ScienceDirect, Journal of China Universities of Posts and Telecommunications, Feb. 2010, 17(1): 77-84.

(Continued)

*Primary Examiner* — Thaddeus J Plecha
(74) *Attorney, Agent, or Firm* — Shumaker & Sieffert, P.A.

(57) ABSTRACT

Contents of a memory may be authenticated using redundant encryption. In some examples, data to be stored by a memory is encrypted with two unique encryption keys—a first encryption key is used generate a cipher text and a second encryption key (different than the first encryption key) is used to generate an authentication tag. The cipher text and authentication tag are stored by the memory. At a later time, the cipher text and authentication tag may be retrieved from the memory and decrypted using the respective encryption keys. After decrypting the cipher text and the authentication tag, the data retrieved from the memory may be authenticated by comparing the plaintext generated by decrypting the cipher text and with the plaintext generated by decrypting the authentication tag. A match between the plaintext indicates the data was not corrupted or modified during storage in the memory.

20 Claims, 10 Drawing Sheets

(56) References Cited

U.S. PATENT DOCUMENTS

| | | | |
|---|---|---|---|
| 8,214,654 B1* | 7/2012 | Wyatt | G06F 21/572 |
| | | | 713/191 |
| 8,375,225 B1* | 2/2013 | Ybarra | 713/193 |
| 2002/0112161 A1 | 8/2002 | Fred, III et al. | |
| 2002/0169972 A1* | 11/2002 | Tanaka et al. | 713/193 |
| 2003/0014639 A1* | 1/2003 | Jackson | G06F 21/64 |
| | | | 713/181 |
| 2004/0019782 A1* | 1/2004 | Hawkes et al. | 713/161 |
| 2005/0232415 A1* | 10/2005 | Little et al. | 380/28 |
| 2006/0259780 A1* | 11/2006 | Benardeau | G06F 21/606 |
| | | | 713/189 |
| 2007/0073326 A1 | 3/2007 | Miller et al. | |
| 2007/0192592 A1* | 8/2007 | Goettfert et al. | 713/162 |
| 2008/0059795 A1 | 3/2008 | Vogel | |
| 2008/0183656 A1* | 7/2008 | Perng et al. | 707/2 |
| 2010/0054475 A1* | 3/2010 | Schneider | 380/277 |
| 2010/0115286 A1* | 5/2010 | Hawkes et al. | 713/189 |
| 2010/0183146 A1* | 7/2010 | Leech | 380/28 |
| 2011/0219173 A1 | 9/2011 | Morita | |
| 2011/0276808 A1* | 11/2011 | Yuki | G06F 21/6209 |
| | | | 713/191 |
| 2013/0013934 A1* | 1/2013 | King et al. | 713/190 |
| 2013/0080790 A1* | 3/2013 | Pean et al. | 713/189 |

OTHER PUBLICATIONS

DS5002FP Secure Microprocessor Chip, 25 pages, downloaded on Sep. 14, 2011, from http://pdfserv.maxim-ic.com/en/ds/DS5002-DS5002FP.

Amit Singh, "A Taste of Computer Security," 6 pages, downloaded on Sep. 14, 2011, from http://www.kernelthread.com/publications/security/smemory.html.

U.S. Appl. No. 13/311,593, filed Dec. 6, 2011, entitled "Memory Location Specific Data Encryption Key".

David J. Wheeler, "A Bulk Data Encryption Algorithm," 9 pages, downloaded on Sep. 14, 2011, from http://www.cix.co.uk/~klockstone/wake.htm.

* cited by examiner

MEMORY AUTHENTICATION WITH REDUNDANT ENCRYPTION

STATEMENT REGARDING FEDERALLY SPONSORED RESEARCH OR DEVELOPMENT

This invention was made with Government support under Contract Number FA8650-12-C-1303, awarded by the U.S. Air Force. The Government has certain rights in the invention.

TECHNICAL FIELD

The disclosure relates to data encryption, and, more particularly, encryption of data stored by a memory.

BACKGROUND

Some digital electronic systems include a memory that stores data, such as instructions used to control the operation of the digital electronic system, proprietary data, intellectual property, or any combination thereof. In some cases, a digital electronic system that includes such a memory includes anti-tamper features that help protect the contents of the memory from unauthorized access.

SUMMARY

Devices, systems, and techniques for authenticating encrypted memory content using redundant encryption of the memory content are described herein. In addition, devices and systems that implement the memory authentication technique described herein. In some examples, a processor of a system enciphers data to be stored by a memory with two unique encryption keys—a first encryption key is used generate a cipher text and a second encryption key (different than the first encryption key) is used to generate an authentication tag. The cipher text and authentication tag are stored by the memory. At a later time, e.g., when retrieval of the data from the memory is desirable, the processor may retrieve the cipher text and authentication tag from the memory and decrypt the cipher tag and authentication tag using the respective encryption keys. After decrypting the cipher text and the authentication tag, the processor may authenticate the data retrieved from the memory by comparing the plaintext generated by decrypting the cipher text and with the plaintext generated by decrypting the authentication tag. A match between the plaintext indicates the data was not corrupted or modified during storage in the memory. However, if the data was altered, the plaintext generated by decrypting the cipher text will not match the plaintext. Thus, in some examples, in response to determining there is a match, the processor may continue to use the retrieved data, and, in response to determining there is not a match, the processor may discard the retrieved data and, in some examples, generate a notification.

In some examples, the cipher text and authentication tag are encrypted using encryption keys that are generated based on respective random numbers and the location of the memory at which the cipher text and authentication tag are stored. Each of a plurality of locations of a memory can be associated with a respective unique pointer value, and an encryption key may be generated based on the unique pointer value and the random number. As a result, the encryption keys that are used to encrypt data that is stored at a particular memory location and generate an authentication tag for that encrypted data are unique and specific to the respective memory locations. The random numbers used to generate the two encryption keys used for memory encryption and authentications are different. In addition, the random numbers used to generate the encryption keys may change over time. In some examples, a plurality of random numbers each associated with one or more respective memory locations may be used to generate the encryption keys at different times during operation. In some examples, the random numbers are unique to a power-up cycle of a system comprising the memory or are generated based on a time at which the data to be stored by the memory at the selected memory location is written to the memory.

In one example, the disclosure is directed to a method that comprises encrypting data to be stored by a memory using a first encryption key, wherein encrypting the data using the first encryption key generates cipher text, encrypting the data to be stored by the memory using a second encryption key different than the first encryption key, wherein encrypting the data using the second encryption key generates an authentication tag, and storing the cipher text and authentication tag in the memory. In some examples, the method includes encrypting the data with an encryption and decryption module. In addition, in some examples, storing the cipher text and authentication tag in the memory comprises storing, with a processor, the cipher text and authentication tag in the memory.

In another example, the disclosure is directed to a system comprising an encryption and decryption module configured to encrypt data using a first encryption key to generate cipher text and encrypt the data using a second encryption key different than the first encryption key to generate an authentication tag, a memory configured to store the cipher text and the authentication tag, and a processor configured to authenticate the contents of the memory by at least controlling the encryption and decryption module to decrypt the cipher text to generate first plaintext and decrypt the authentication tag to generate second plaintext, and comparing the first and second plaintext. The encryption and decryption module may comprise one or more sub-modules, such as a first module configured to encrypt the data using the first encryption key and a second module configured to encrypt the data using the second encryption key.

In another example, the disclosure is directed to a computer-readable storage medium comprising instructions. When executed by a processor, the instructions cause the processor to control an encryption and decryption module to encrypt data to be stored by a memory using a first encryption key to generate cipher text, control the encryption and decryption module to encrypt the data to be stored by the memory using a second encryption key different than the first encryption key to generate an authentication tag, store the cipher text and authentication tag in the memory, and after storing the cipher text and authentication tag in the memory, retrieve the cipher text and authentication tag from the memory and authenticate the retrieved cipher text. The instructions cause the processor to authenticate the retrieved cipher text by at least controlling the encryption and decryption module to decrypt the cipher text using the first encryption key to generate first plaintext, controlling the encryption and decryption module to decrypt the authentication tag using the second encryption key to generate second plaintext, and comparing the first and second plaintext.

In another example, the disclosure is directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a nontransitory storage medium.

The details of one or more examples are set forth in the accompanying drawings and the description below. Other features, objects, and advantages in addition to those described below will be apparent from the description and drawings, and from the claims.

DETAILED DESCRIPTION

Example devices, systems, and techniques for authenticating memory contents are described in this disclosure. Data stored by a memory may be authenticated using redundant encryption of the data. As described in further detail below, in some examples, data to be stored by a memory can be encrypted with two different unique encryption keys—a first encryption key is used generate a cipher text and a second encryption key (different than the first encryption key) is used to generate an authentication tag. The cipher text and authentication tag are stored by the memory. At a later time, the cipher text and authentication tag may be retrieved from the memory and decrypted using the respective encryption keys. The data retrieved from the memory may be authenticated by comparing the plaintext generated by decrypting the cipher text and with the plaintext generated by decrypting the authentication tag. A match between the plaintext indicates the data was not corrupted or modified during storage in the memory, and a mismatch between the plaintext indicates the data stored by the memory was corrupted or modified.

Figure 1:
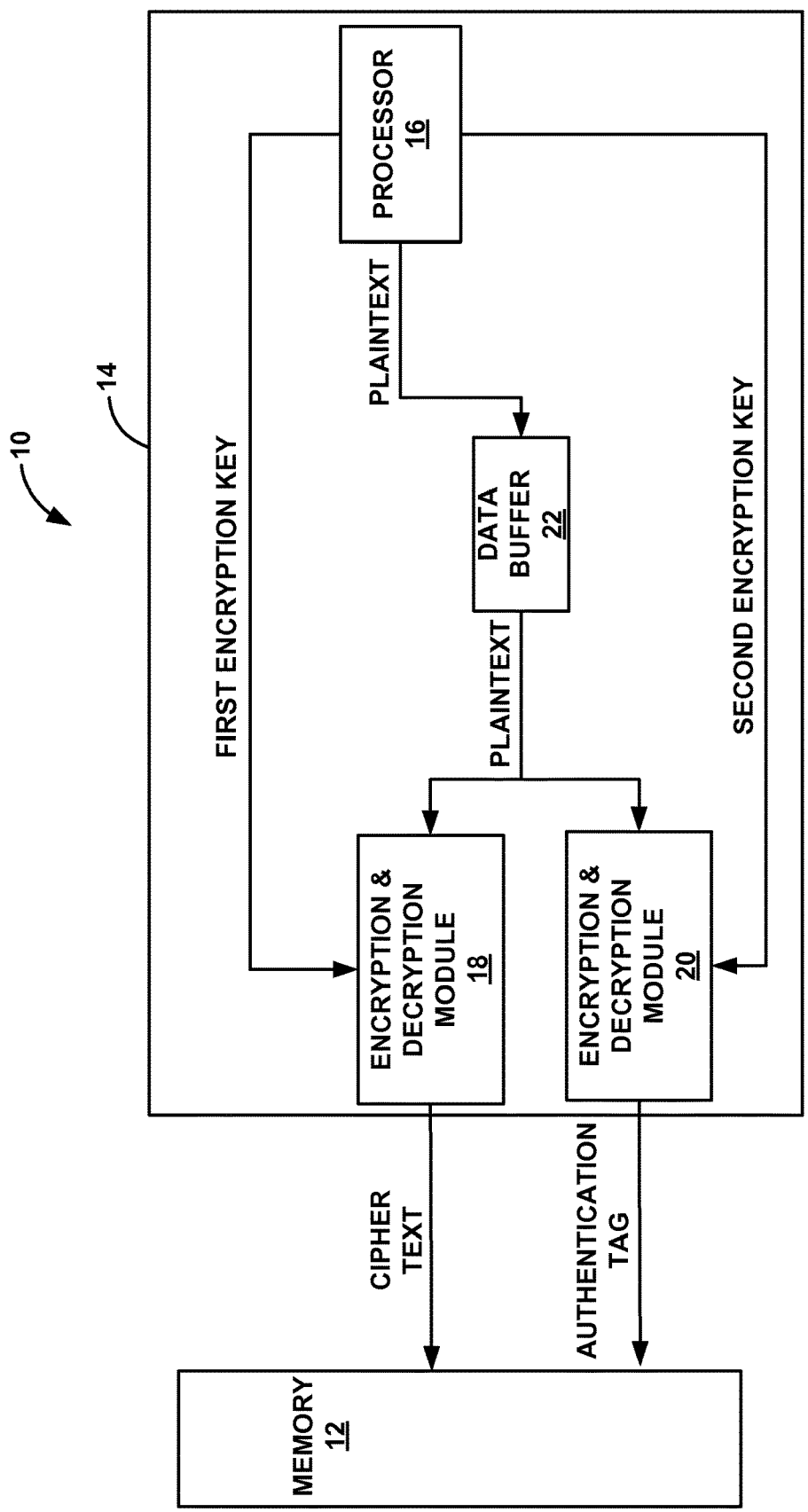
FIG. 1 is a functional block diagram of an example system that includes a memory, a first encryption and decryption module that is configured to encrypt data stored by the memory using a first encryption key to generate cipher text, and a second encryption and decryption module that is configured to encrypt the data stored by the memory using a second encryption key to generate an authentication tag.

FIG. 1 is a functional block diagram illustrating an example system 10 that includes memory 12 and control system 14, which is configured to store (also referred to herein as "write") encrypted data to memory 12 and read encrypted data stored by memory 12. System 10 can be, for example, a digital electronic system. Control system 14 includes processor 16, first encryption and decryption module 18, second encryption and decryption module 20, and data buffer 22.

Control system 14 can comprise any suitable arrangement of hardware, software, firmware, or any combination thereof, to perform the techniques attributed to control system 14 and processor 16, and first and second encryption and decryption modules 18, 20 herein. For example, control system 14 may include any one or more microprocessors, digital signal processors (DSPs), application specific integrated circuits (ASICs), field programmable gate arrays (FPGAs), or any other equivalent integrated or discrete logic circuitry, as well as any combinations of such components. Although processor 16 and first and second encryption and decryption modules 18, 20 are described as separate modules, in some examples, processor 16, first encryption and decryption module 18, and second encryption and decryption module 20 can be functionally integrated. For example, first and second encryption and decryption modules 18, 20 may be implemented in the same hardware component. In some examples, processor 16, first encryption and decryption module 18, and second encryption and decryption module 20 correspond to individual hardware units, such as ASICs, DSPs, FPGAs, or other hardware units, or one or more common hardware units.

Processor 16 of control system 14 is configured to control the writing of data to memory 12 and reading of data from memory 12. In this way, processor 16 may also be referred to as a memory controller. As described in further detail below, the data written to memory 12 by processor 16 is encrypted by first encryption and decryption module 18 prior to being written to memory 12, and the data read from memory 12 by processor 12 is decrypted by first encryption and decryption module 18. In addition, an authentication tag for authenticating data retrieved from memory 12 is generated by second encryption and decryption module 18. Encryption and decryption modules 18, 20 may be configured to encrypt and decrypt data using any suitable technique, such as by implement an advanced encryption standard (AES) algorithm, a data encryption standard (DES) algorithm, a block cipher (e.g., RC5) algorithm, or any combination thereof. In some examples, encryption and decryption modules 18, 20 use the same encryption algorithm, while other examples, encryption and decryption modules 18, 20 use different encryption algorithms.

Memory 12 is configured to store data in encrypted form (also referred to herein as "cipher text") and one or more authentication tags that may be used, e.g., by processor 16, to authenticate the contents of memory 12. Memory 12 includes any volatile or non-volatile media, such as a random access memory (RAM), read only memory (ROM), non-volatile RAM (NVRAM), electrically erasable programmable ROM (EEPROM), flash memory, and the like. In some examples, memory 12 may be internal to control system 14. For example, memory 12 may be enclosed in a common housing as control system 14, on the same integrated circuit chip as control system 14, or both.

In other examples, memory 12 may be external to control system 14, e.g., may be external to a package in which control system 14 is housed. For example, control system 14 may be defined by a semiconductor device (e.g., using a system-on-chip design methodology) or a plurality of semiconductor devices and may be housed in a semiconductor package, and memory 12 may be external to that semiconductor package. In some of these examples, electrical signals transmit between memory 12 and control system 14 via one or more electrically conductive pathways (e.g., a data bus and address bus). In other examples, memory 12 and control system 14 may wirelessly communicate with each other.

Data stored by memory 12 can include, for example, critical program information for the operation of system 10, protected intellectual property, and confidential information, such as classified information to which access is restricted by law or regulation to particular groups of persons. Encrypting data stored by memory 12 may help reduce unauthorized technology transfer, help protect any technological advantage provided to a particular entity from the knowledge and/or use of the stored data, and protect technological competitiveness afforded by the use of the stored data. For example, encrypting data stored by memory 12 may help minimize the possibility that system 10 may be reverse engineered by decreasing the accessibility to the contents of memory 12.

In examples in which memory 12 is external to control system 14, an adversary (e.g., an unauthorized person or entity) may attempt to access contents of memory 12 by probing signal traces between control system 14 and memory 12. Encrypting the contents of memory 12 may help prevent the adversary from obtaining intelligible data from observing the signals transmitted between control system 14 and memory 12.

In some cases, encryption of the contents of memory 12 alone may be insufficient to protect against some forms of tampering with system 10, such as intentional modification or corruption of stored memory 12 contents. For example, while memory encryption may be useful for protecting the contents of memory 12 from being obtained by an adversary in an intelligible form, memory encryption may not necessarily prevent an adversary from corrupting or otherwise altering the contents of memory 12. Alteration of contents of memory 12 may have undesirable affects. For example, because memory 12 may store program information for operation of system 10, altering the contents of memory 12 may cause the behavior of system 10 to be altered.

Memory authentication, executed by processor 16 or another processor, may be useful for protecting against unauthorized tampering with system 10, such as by providing a layer of protection against active attacks to system 10, where an adversary seeks to change the behavior of system 10, and not just observe memory accesses. In the absence of memory authentication, control system 14 may retrieve and decrypt data from memory 12, and subsequently use the data without knowing that the data was altered in some manner. Control system 14 may authenticate the contents of memory 12 using an authentication techniques described herein.

In some examples, control system 14 implements an authentication technique that results in the encryption of the data to be stored by memory 12 twice, using two different unique encryption keys. Hence, the authentication technique may be referred to as a redundant encryption authentication technique (and also referred to as a redundant encryption authentication algorithm). FIG. 1 illustrates an example of how an authentication technique using redundant encryption may be implemented. In the example shown in FIG. 1, the implementation of the authentication technique is controlled by processor 16. Processor 16 may select data (e.g., referred to herein as "plaintext" or a "plaintext word," although the data may include more than one word or a part of a word) to be stored by memory 12. In some examples, the data to be written to memory 12 under the control of processor 16 is stored in data buffer 22. In some examples, data buffer 22 can be a part of an internal memory (not shown in FIG. 1) of control system 14 or can be separate from the internal memory. The internal memory may be internal to control system 14 and, in some examples, stores instructions for execution by processor 16 for operation of processor 16 and other data used during operation of control system 14. In some examples in which control system 14 is an ASIC, FPGA or another integrated circuit, or otherwise comprises an ASIC, FPGA or another integrated circuit, the internal memory can be a memory element of the integrated circuit (e.g., a memory block or a flip-flop).

As shown in FIG. 1, processor 16 may provide first encryption and decryption module 18 with a first encryption key and provide a second encryption key, different than the first encryption key, to second encryption and decryption module 20. Under the control of processor 16, first encryption and decryption module 18 encrypts the plaintext using the first encryption key to generate cipher text, and second encryption and decryption module 18 encrypts the same plaintext using the second encryption key to generate an authentication tag. Control system 14 may then write the cipher text and authentication tag to memory 12. The cipher text and authentication tag are stored together in memory 12 in a manner that enables processor 16 to associate stored cipher text with a respective authentication tag. This may enable processor 16 to later retrieve the cipher text and associated authentication tag for authenticating the cipher text.

In the example shown in FIG. 1, the redundant encryption of the plaintext word is performed in parallel by two separate encryption and decryption modules 18, 20. In other examples, the redundant encryption of the plaintext word may be performed sequentially by two separate encryption and decryption modules 18, 20 or by a common encryption and decryption module, in which case control system 14 may only include one encryption and decryption module.

Thus, in some examples, encryption and decryption modules 18, 20 may be a part of a common module.

Figure 2:
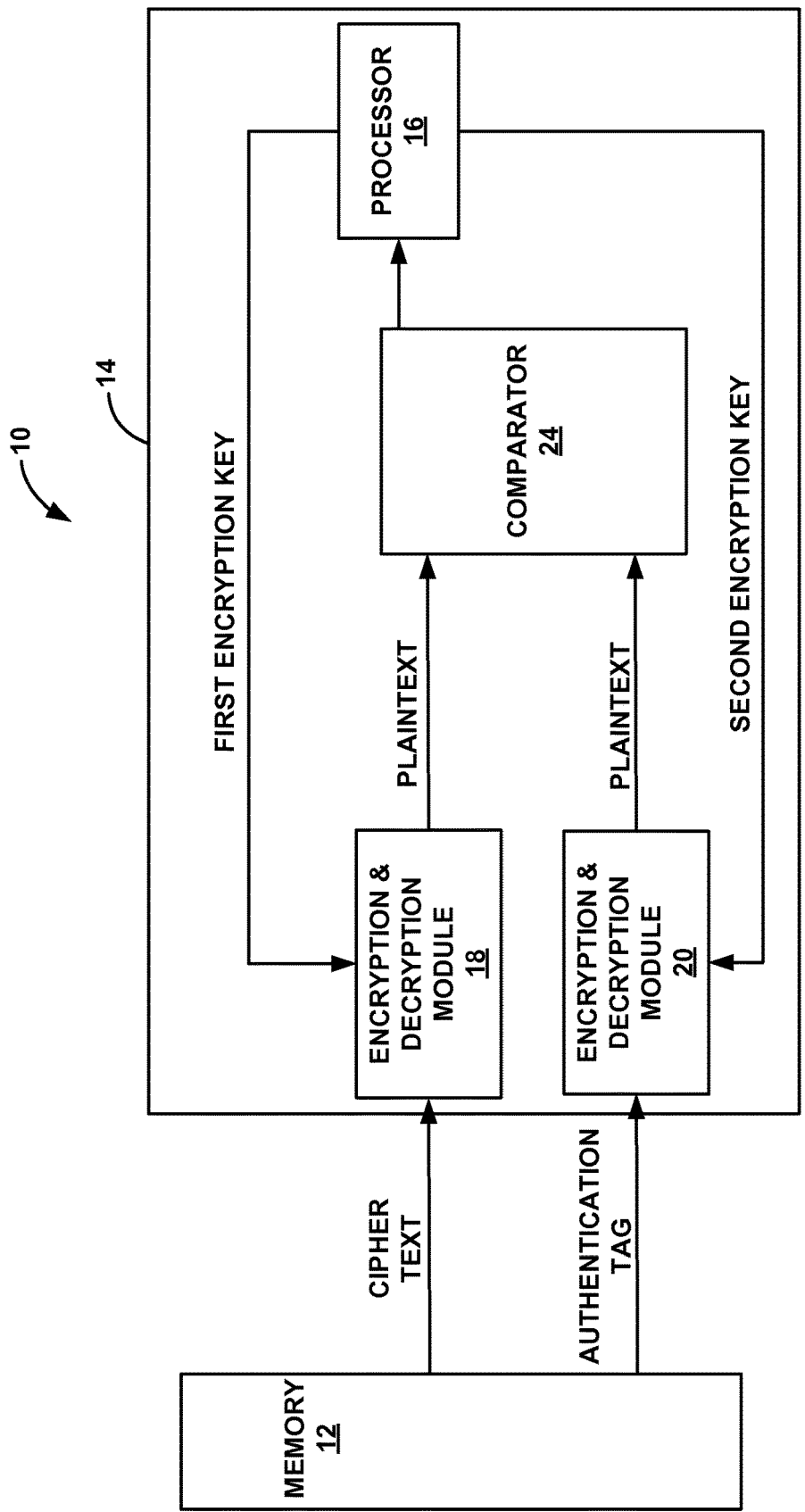
FIG. 2 is a functional block diagram of the example system of FIG. 1, and illustrates the authentication of encrypted data stored by the memory using the authentication tag.

FIG. 2 illustrates is a functional block diagram of the example system of FIG. 1, and illustrates the authentication of encrypted data stored by memory 12. As shown in FIG. 2, when control system 14 retrieves the data from memory 12, control system 14 may retrieve both the cipher text and authentication tag from memory 12. Under the control of processor 16, first encryption and decryption module 18 decrypts the retrieved cipher text using the first encryption key to generate first plaintext (e.g., a first plaintext word), and second encryption and decryption module 20 decrypts the retrieved authentication tag using the second encryption key to generate second plaintext (e.g., a second plaintext word). In the example shown in FIG. 2, first and second encryption and decryption modules 18, 20 decrypt the cipher text and authentication tag, respectively, in parallel. In other examples, first and second encryption and decryption module 18, 20 may decrypt the cipher text and authentication tag at different times, which may or may not overlap.

Processor 16 authenticates the data retrieved from memory 12 by comparing, using comparator 24, the first plaintext generated by decrypting the cipher text with the second plaintext generated by decrypting the authentication tag. In some examples, comparator 24 is configured to provide a binary output that indicates that either the first and second plaintext words match or do not match, without indicating the extent of the mismatch. In other examples, compactor 24 may provide a more robust output that enables processor 16 to determine the extent of mismatch between the first and second plaintext words, which may be useful for determining the extent to which the contents of memory 12 were altered or the manner in which the contents of memory 12 were altered.

In response to determining the output of comparator 24 indicates the first plaintext matches the second plaintext, processor 16 authenticates the data retrieved from memory 12, e.g., determines that the data was not corrupted or modified during storage in memory 12. Processor 16 may then use the plaintext data, e.g., for controlling the operation of system 10. In response to determining the output of comparator 24 indicates there is a mismatch between the first plaintext and the second plaintext, processor 16 determines that the data stored by memory 12 was altered. Processor 16 may, for example, discard the data in response to determining the data retrieved from memory 12 was altered and, in some cases, generate a notification that is stored by an internal memory or transmitted to another device. Although the example shown in FIG. 2 illustrates comparator 24 as a separate module from processor 16, in some examples, processor 16 and comparator 24 may be integrated together in a common module.

The example authentication technique described with respect to FIGS. 1 and 2 does not utilize a hash function to authenticate contents of memory 12. While some existing memory authentication techniques that use a hash function may be useful for protecting against active attacks to memory 12, the existing memory authentication techniques using a hash function may be relatively burdensome on a system due to the processing time required for performing the hash. Some existing memory authentication techniques are performed by calculating a hash of the unencrypted data, and subsequently storing both encrypted data and the hash digest in external memory. The encryption of the data and the calculation of the hash of the unencrypted data may be performed in parallel.

In these existing memory authentication techniques, when data is retrieved from memory, both the hash and the cipher text are returned. In order to authenticate the data to determine if the data has been changed, the cipher text is first decrypted, and the resulting plaintext is subsequently hashed. Thus, the input to the hash is a function of the output of a decryption module. If the hash digest resulting from the hash of the decrypted text matches the hash retrieved from the memory, the control system determines that the data has not been modified. Because the authentication requires hashing the output of a decryption module, the decryption and authentication operations may need to be performed in series, which may adversely affect the performance (e.g., speed) of data retrieval compared to data storage, particularly when compared to using a decryption scheme without authentication. This performance limitation may be compounded by the fact that some hash algorithms, such as a message digest algorithm (e.g., MD5) or a secure hash algorithm (e.g., SHA1 or SHA2) are relatively large complex functions which take significant processing time to complete and may take longer to complete than the time required for data encryption/decryption.

In contrast to memory authentication techniques in which authentication of an enciphered message can only occur after the message is completely deciphered, with the redundant encryption authentication technique described herein, authentication data can be processed (e.g., the authentication tag may be decrypted) while deciphering operation (by first encryption and decryption module 18) is progress. This may increase performance of system 10. Using the example memory authentication techniques described herein, control system 14 may authenticate retrieved from memory 12 faster than if a hash function was used to authenticate data because the input to second encryption and decryption module 20, which that processes the authentication tag, is not dependent on the decryption of the cipher text by first encryption and decryption module 18. As a result, the decryption of cipher text and an authentication tag may (but need not necessarily) occur in parallel. In addition, the example memory authentication techniques described herein do not require the use of a hash function, and, instead, use redundant memory encryption to authenticate memory contents, which may require less intensive processing than using both memory encryption and a hash function.

In addition, some examples described herein the encrypted memory contents and the respective authentication tag are equivalent in size, which may help conserve memory space. In contrast, authentication techniques that use a hash function to authenticate memory contents may use an authentication tag that is larger than the block size of the associated encrypted memory location, which may result in wasted memory space. If system 10 includes processor 16 that accesses memory 12 dynamically, such that contents of memory 12 are updated at irregular intervals, contents of memory 12 may be authenticated in relatively small, discrete n-bit blocks. The block size, n, may be equal to the encryption block size (e.g., 128 bits for an advanced encryption standard (AES)). If, for example, the digest for a hash algorithm, such as SHA1 or SHA2, has a size of about 160, 256 or 512 bits, and the hash algorithm is used with an AES algorithm, the encryption block size and authentication tag may have different sizes. As a result, memory resources not needed to store the cipher text may be needed to store the hash tag, thereby resulting in an inefficient use of memory space. In contrast, in some examples of system 10, the authentication tag and cipher text may have the same size, such that data blocks of the same size may be used to store the authentication tag and cipher text.

As described above, although system 10 includes two encryption and decryption module 18, 20 in the example shown in FIGS. 1 and 2, in other examples, one encryption and decryption module may be used to generate the cipher text and the authentication tag, e.g., in series. This may help reduce the hardware footprint of system. In contrast, in existing systems that use a hash function to authenticate memory contents, the hardware footprint of the systems may be relatively large because the systems include both hardware for executing a hash function and enciphering/deciphering.

As discussed above, it may be desirable to minimize or even prevent tampering with system 10 in order to protect the contents of system 10, such as the contents stored by memory 12, the configuration of the components of system 10, and the like. In addition to the memory encryption and authentication, one or more other techniques can be used to help prevent tampering with system 10. For example, in examples in which control system 14 is integrated into a single ASIC or FPGA, some components of system 10 may be integrated into a well defined periphery (e.g., the periphery defined by a package in which the integrated circuit is housed). The integrated circuit housing or other package in which control system 14 and system 10 are contained (e.g., partially or completely enclosed) can act as a physical barrier that protects the components of system 10 from unauthorized access.

In addition, in some examples, an electronic tamper sensor can be integrated into the package in which control system 14 is housed and/or the package in which system 10 is housed or placed (e.g., a printed board on which system 10 is mounted is placed or a housing in which the printed board is placed). The electronic tamper sensor may be configured to detect tampering with system 10, such as by detecting physical movement of one or more component of system 10, impacts of a certain magnitude that indicate physical tampering, and the like. The electronic tamper sensor may be configured to take one or more actions in response to the detection of tampering. For example, the electronic tamper sensor can be configured to generate a notification to a user or processor 16 in response to detecting physical tampering, and, in some response, the user, processor 16, or another component can cause data stored by memory 12 and an internal memory of control system 14 to be inaccessible, such as by physical, chemical, or electrical destruction or by deletion of stored encryption keys or information necessary to determine the encryption keys from the internal memory of control system 14.

In the example shown in FIG. 1, memory 12 is external to control system 14, e.g., if control system 14 is on one or more integrated circuits, memory 12 can be physically separate from the integrated circuit. In some cases, it may be practical and desirable to implement additional memory 12 separate from control system 14, such as when relatively large amounts of randomly accessible memory is needed to support the operation of system 10 and it is not practical to incorporate the memory on the same one or more integrated circuits as control system 14.

Figure 3:
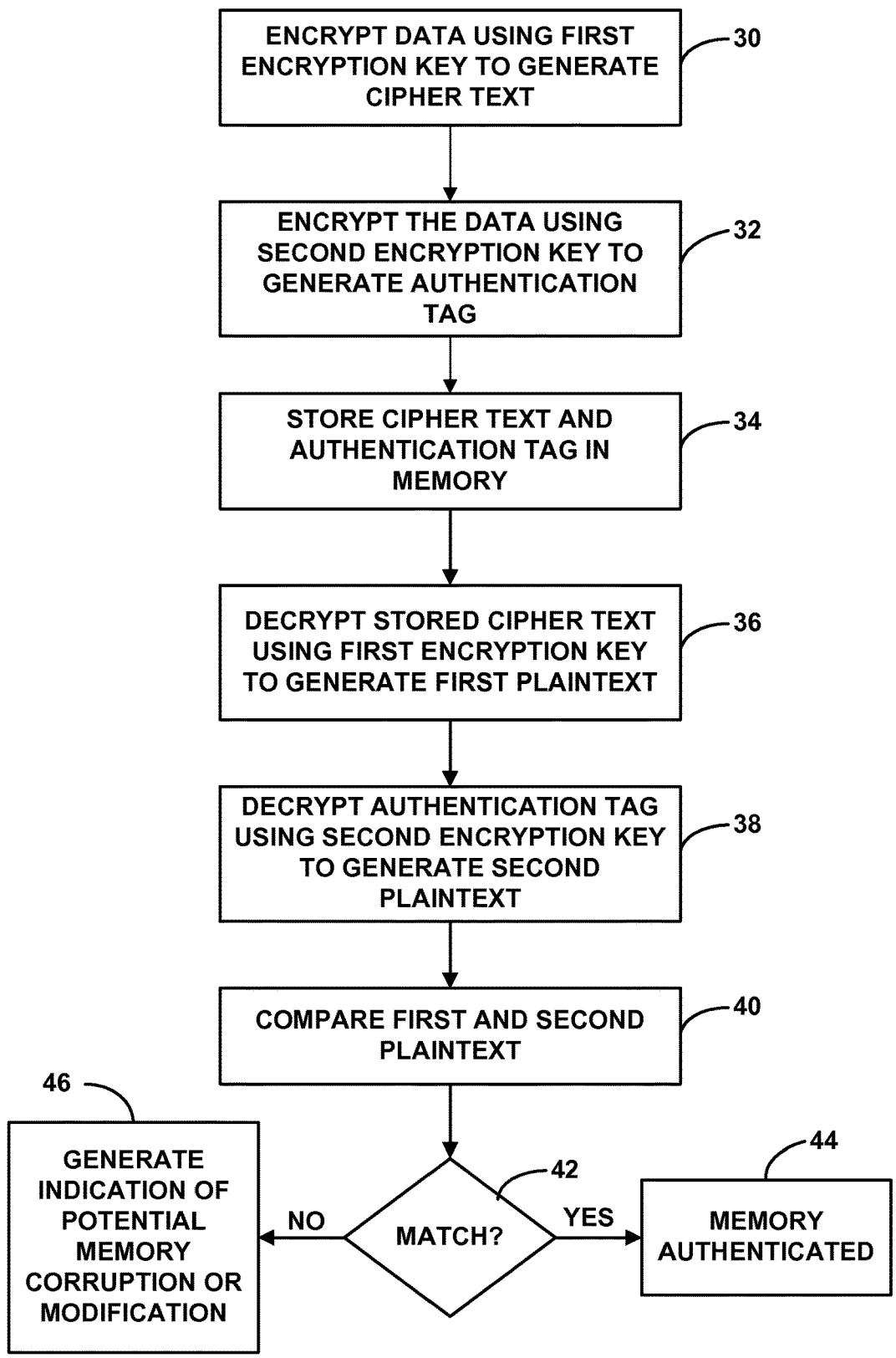
FIG. 3 is a flow diagram of an example technique for authenticating encrypted data stored by a memory.

FIG. 3 is a flow diagram illustrating an example technique in which system 10 may authenticate data stored by memory 12. The technique shown in FIG. 3 may be implemented, for example, during a write operation controlled by processor 16 of system 10 or a processor of another device. While FIG. 3 is described with respect to system 10 (FIG. 1), in other examples, the technique shown in FIG. 3 can be implemented by another system alone or in combination with system 10.

In accordance with the technique shown in FIG. 3, processor 16 controls first encryption and decryption module 18 to encrypt data (e.g., a plaintext word or any other data) using a first encryption key, thereby generating cipher text (30). Although not shown in FIG. 3, processor 16 may determine the data that is to be stored in memory 12 and, in some examples, may output the data via a data bus to data buffer 22. Processor 16 may determine the data to be stored in memory 12 by, for example, receiving the data from an external source (e.g., another electrical device or user input), or generating the data. In some examples, data buffer 22 provides the plaintext to be encrypted to encryption and decryption modules 18, 20. In other examples, processor 16 provides the plaintext data directly to encryption and decryption modules 18, 20.

Processor 16 controls second encryption and decryption module 20 to encrypt the same plaintext data encrypted by first encryption and decryption module 18 with a second encryption key, thereby generating an authentication tag (32). In some examples, processor controls first and second encryption and decryption modules 18, 20 to encrypt the plaintext data in parallel (e.g., at the same time or nearly at the same time), while in other examples, processor 16 controls first and second encryption and decryption modules 18, 20 to encrypt the plaintext data at different times (e.g., the cipher text may first be generated, followed by the authentication tag, or the authentication tag may first be generated, followed by the cipher text).

First and second encryption and decryption modules 18, 20 may use the same or different encryption algorithms to generate cipher text and the authentication tag, respectively. Any suitable one or more encryption algorithms may be used. In addition, the first and second encryption keys may be generated (e.g., by processor 16 or another processor of system 10) using any suitable technique. One technique for generating the first and second encryption keys is described with respect to FIGS. 5-9, although other techniques may also be used.

Processor 16 stores the cipher text and authentication tag in memory (34). At a later time, when control system 14 retrieves the stored data including the cipher text from memory 12, processor 16 may access memory 12 and receives the cipher text and associated authentication tag. Under the control of processor 16, first encryption and decryption module 18 decrypts the cipher text using the first encryption key (36), thereby generating first plaintext. Under the control of processor 16, second encryption and decryption module 18 decrypts the authentication tag using the second encryption key (38), thereby generating second plaintext.

In some examples, the cipher text and respective authentication tag are stored at the same location memory 12, such that when processor 16 may retrieve both the cipher text and authentication tag by accessing a single memory location. Processor 16 may determine which portion of the retrieved data is the cipher text and which portion of the retrieved data is the authentication tag using any suitable technique. In some cases, processor 16 identifies the cipher text and associated authentication tag based on the location of the data in the memory. In some cases, processor 16 determines that the cipher text is the first predetermined number of bits of the retrieved data and the authentication tag is the second predetermined number of bits of the retrieved data. Other techniques may also be used.

Processor 16 may determine the first and second encryption keys used to generate the cipher text and authentication tag, respectively, using any suitable technique. In some examples, the first and second encryption keys are stored by a memory internal to control system 14 and accessible to processor 16. In other examples, processor 16 may control one or more key generation modules (e.g., described with respect to FIGS. 5 and 8) to generate the encryption keys based on known information that was used to generate the encryption keys when the data was first stored by memory 12.

After generating the first and second plaintext (36, 38), processor 16 compares the first and second plaintext (40), e.g., using comparator 24 (FIG. 2). In the example shown in FIG. 3, processor 16 determines whether the first and second plaintext match (42). In response to determining the first and second plaintext words match ("YES" branch of decision block 42), e.g., based on the output of comparator 24, processor 16 determines that the retrieved memory content is authenticated and was not altered (44). Processor 16 may then use the retrieved memory content.

On the other hand, in response to determining the first and second plaintext words do not match ("NO" branch of decision block 42), e.g., based on the output of comparator 24, processor 16 determines that the retrieved memory content may have been altered, and, therefore, does not authenticate the retrieved memory content. In response, processor 16 may generate an indication that there was a potential corruption or modification to memory 12 (46). In some examples, the indication may be a flag, value, or other indication stored by an internal memory of control system 14, a signal transmitted to another device in communication with control system 14, or both.

In some examples, one or both of first and second encryption and decryption modules 18, 20 are configured to encrypt data (to generate the cipher text or authentication tag) using an encryption key that is unique to a location of memory 12; data stored at the memory location may be encrypted and decrypted using the memory location specific encryption key. For example, in some examples, an encryption key, whether it is the first encryption key or the second encryption key, may be based on a pointer value unique to the memory location at which the data word (e.g., the cipher text or authentication tag) is stored and a random number. The unique pointer may be, for example, an address that identifies the location of a data word within memory 12 or a packet identifier of a data packet that is used to transmit the data word (e.g., corresponding to the cipher text or the authentication tag) to memory 12. As a result, in some examples, each cipher text or authentication tag (or both) stored by memory 12 at a respective location is encrypted with a different encryption key. The random number used to generate the encryption key may change over time, such that for different data words stored by a memory may be encrypted with encryption keys generated with different random numbers. In addition, the random number may remain non-observable to an external viewer, e.g., external to system 10.

In some examples in which the first and second encryption keys are memory location specific, the cipher text and authentication tag may be stored together in memory 12 such that one unique pointer value may be used to generate both the first and second encryption keys. However, in some examples in which both the first and second encryption keys used to generate the cipher text and authentication tag, respectively, are generated based on a memory location and a random number, the random numbers used to generate the encryption keys are different. As a result, the first and second encryption keys may be unique, even if they are both generated using the same pointer value.

The encryption technique (also referred to herein as an encryption algorithm) that uses a memory location specific encryption key may be used to encrypt and decrypt data in any system that includes a memory in which data is encrypted and decrypted, and where a unique pointer exists to identify the location of the data in the memory, such as the location of each contiguous data word of a larger data block. A data word may be, for example, a fixed size group of bits that are handled by the system, or a component of the system, as a single unit. For example, the data word may be a unit of length used by the design of a processor (e.g., processor 16 shown in FIG. 1) of the system that accesses the data stored by the memory. In some examples in which the unique pointer includes a memory address, the memory location may be associated with a single memory address, while in other examples in which the unique pointer includes a memory address, the memory location may be associated with multiple memory addresses (e.g., a block of contiguous or non-contiguous memory locations). In this example, the encryption key used to encrypt the contents of the memory stored at the memory location may be based on one or more of the memory addresses. For example, a unique pointer may be associated with the block of multiple memory addresses.

Figure 4:
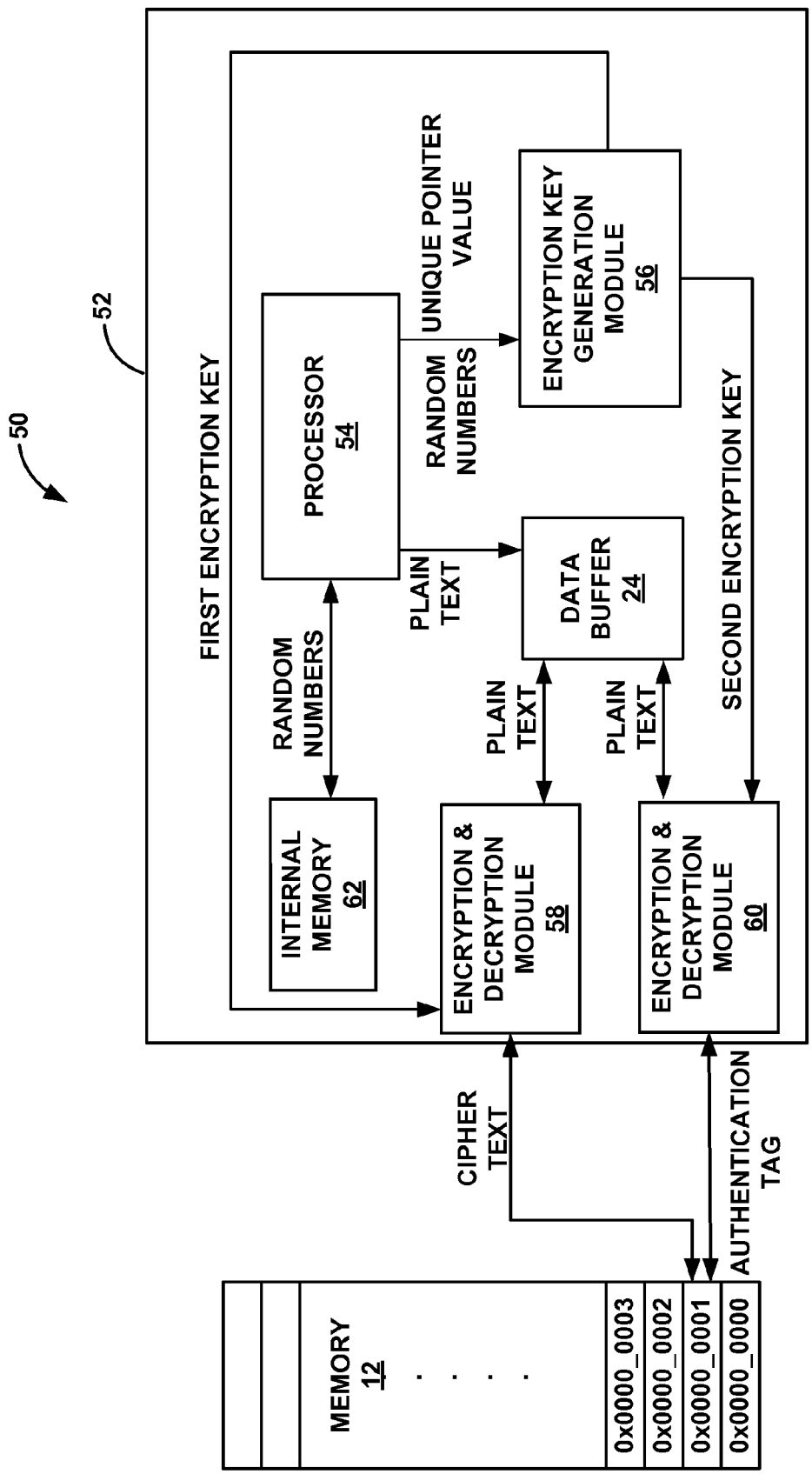
FIG. 4 is a functional block diagram of another example system that includes a memory, a first encryption and decryption module that is configured to encrypt data stored by the memory using a first encryption key to generate cipher text, and a second encryption and decryption module that is configured to encrypt data stored by the memory using a second encryption key to generate an authentication tag, where the first and second encryption and decryption modules encrypt data using memory location specific encryption keys.

FIG. 4 is a functional block diagram of an example system 50 that is configured to store encrypted data to memory 12, where the data was encrypted using a first encryption key unique to the location in memory 12 at which the data is stored. In addition, system 50 is configured to authenticate contents of memory 12 using the technique described above with respect to FIGS. 1-3. In the example shown in FIG. 4, the authentication tag is generated using a memory location specific encryption key. In other examples, the authentication tag may be generated using an encryption key that is not generated based on the memory location at which the authentication tag is stored.

System 50 includes memory 12 and control system 52. As with system 10, system 50 can be, for example, a digital electronic system. In addition, as with control system 14 (FIG. 1), control system 52 is configured to store encrypted data to memory 12 and read encrypted data stored by memory 12. Control system 52 includes data buffer 22, processor 54, encryption key generation module 56 (also referred to as "key generation module"), first encryption and decryption module 58, second encryption and decryption module 60, and internal memory 62.

Control system 52 may comprise any suitable arrangement of hardware, software, firmware, or any combination thereof, to perform the techniques attributed to control system 52 and processor 54, key generation module 56, and encryption and decryption modules 58, 60 herein. For example, control system 52 may include any one or more microprocessors, DSPs, ASICs, FPGAs, or any other equivalent integrated or discrete hardware or logic circuitry, as well as any combinations of such components. Although processor 54, key generation module 56, and encryption and decryption modules 58, 60 are described as separate modules, in some examples, processor 54, key generation module 56, and encryption and decryption modules 58, 60 can be functionally integrated. For example, key generation module 56 and encryption and decryption modules 58, 60 may be provided by the same hardware. In some examples, processor 54, key generation module 56, and encryption and decryption modules 58, 60 correspond to individual hardware units, such as ASICs, DSPs, FPGAs, or other hardware units, or one or more common hardware units.

Processor 54 of control system 52 may be similar to processor 16 of control system 10 (FIGS. 1 and 2), and is configured to control the writing of data to memory 12 and reading of data from memory 12. Memory 12 may be external to control system 52 in some examples. In other examples, memory 12 may be internal to control system 52. As described in further detail below, the data written to memory 12 by processor 54 is encrypted by encryption and decryption module 58 using a first memory location specific encryption key prior to being written to memory 12, and the data read from memory 12 by processor 12 is decrypted by encryption and decryption module 58 using the first memory location specific encryption key. In addition, processor 54 is configured to authenticate the data read from memory 12, e.g., prior to using the data, using an authentication tag that is stored by memory 12 and generated by encrypting the data written to memory 12 with encryption and decryption module 60 using a second memory location specific encryption key different than the first memory location specific encryption key.

In some examples, processor 54 may be configured to select (e.g., determine) the data to be written to memory 12. For example, processor 54 may generate the data or may receive the data to be written to memory 12 from an external source, such as an external component (e.g., an external computing device) or a user interface (not shown in FIG. 4) that is electrically and communicatively connected to processor 54. In addition, in some examples, processor 54 may be configured to select a location within memory 12 to which the data is to be written. Processor 54 may include a memory bus and an address bus (also referred to as a memory address bus), which is used to specify a location within memory 12 to which data is written to or read from.

Processor 54 can select a location within memory 12 to which the selected data is written using any suitable technique. In some examples, processor 54 may write data to memory 12 using data words of predetermined sizes (e.g., predetermined number of bits or bytes), such that data words of predetermined sizes are stored by memory 12. Memory 12 may, for example, include a larger data block comprising a plurality of data words of similar or identical sizes. In other examples, processor 54 may be configured to write data to memory 12 via single bytes. In these examples, data too large to be stored in a single byte may reside in multiple bytes occupying a sequence of consecutive addresses. In some examples, processor 54 is configured to select a memory location that is sized to store both cipher text and the corresponding authentication tag, which are both generated by enciphering the same data word (or other common data), such that a common pointer value may be associated with cipher text and the associated authentication tag.

When processor 54 selects a location within memory 12 for storing the selected data, processor 54 may also select a pointer value that is unique to the memory location and associated with the memory location. The memory location may be, for example, the memory address specified by the memory address bus of processor 54 or the memory address specifying a physical space within memory 12. In some cases, the memory address specified by the memory address bus of processor 54 or the actual memory address used by memory 12 may be the same. In other examples, the memory address specified by the memory address bus of processor 54 or the actual memory address used by memory 12 may be different (e.g., linearly or non-linearly linked).

In some examples, the unique pointer value may only associate with the respective memory location and not associated with any other memory locations. For example, processor 54 may select a location within memory 12 by selecting a memory address, which may be a unique number associated with the data word size or individual (single) byte. A memory location may, for example, identify a physical location within memory 12. Each memory location within memory 12 may be associated with a respective memory address, such that when processor 54 selects a memory address to read data from or write data to, only one location in memory 12 is accessed by processor 54. In this way, the memory address may be a unique pointer value for a memory location. The memory address may also be referred to as an absolute address, an explicit address, or a specific address in some examples. An example of a memory address is, for example, a 32 bit memory address. Another example of a memory address is a logical memory address. Data within memory 12 may be organized using logical addresses, which may map to physical addresses.

In examples in which memory 12 and control system 14 communicate over a communication channel, whether wired or wireless, the unique pointer value used to generate an encryption key may be, for example, a packet identifier for a data packet sent over a communications link, where the data packet includes the data to be written to the selected memory location.

In some examples, the data to be written to memory 12 under the control of processor 54 is stored in data buffer 22. In some examples, data buffer 22 can be a part of internal memory 62 of control system 52 or can be separate from internal memory 62. Internal memory 62 is internal to control system 52 and, in some examples, stores instructions for execution by processor 54 for operation of processor 54 and other data used during operation of control system 52. In some examples in which control system 52 is an ASIC, FPGA or another integrated circuit, or otherwise comprises an ASIC, FPGA or another integrated circuit, internal memory 62 can be a memory element of the integrated circuit (e.g., a memory block or a flip-flop).

Electrically conductive pathways between control system 52 and components external to system 52, including memory 12, may provide a channel through with which system 50 can be electrically tampered. For example, an adversary (e.g., an unauthorized party) may probe electrical signal traces between control system 52 and the external components, and the information gathered through the probing may provide an adversary with the information with which the design of system 50 may be reverse engineered. In order to help minimize the possibility that any information obtained from probing the electrical signal traces between memory 12 and control system 52, control system 52 is configured to encrypt data that is written to memory 12 using an encryption key that is unique to the memory location at which the data is stored. In some examples, control system 52 is also configured to generate an authentication tag using an encryption key that is unique to the memory location at which the data and corresponding authentication tag used to authenticate the data is stored.

As a result of using memory location specific encryption keys that are constantly changing depending on the memory location that is being accessed by control system 52, any information an adversary may obtain from probing the electrical signal traces between memory 12 and control system 52 otherwise obtaining data stored by memory 12 will be unintelligible to the adversary unless the adversary is able to decrypt the retrieved data. However, to decrypt the data stored by memory 12 to both use the data and to authenticate the data, e.g., using the authentication technique described above with respect to FIGS. 1-3, the encryption keys must be known. The encryption technique implemented by system 52 to encrypt the contents of memory 12 increases the difficulty with which the adversary may determine the encryption keys used to encrypt the contents of memory 12.

The encryption technique with which control system 52 encrypts data stored by memory 12 to generate cipher text results in a unique encryption key for each memory location of memory 12. As a result, the adversary would need to determine multiple encryption keys in order to decrypt data stored at more than one location of memory 12. Indeed, even if the adversary determines one encryption key for one location of memory 12, the data stored at the location may not provide the adversary with any useful information due to its relatively small content (e.g., a single data word), and the data stored at multiple memory locations may be necessary to obtain useful information (e.g., a sufficient amount of information to reverse engineer system 50). Thus, by generating memory location specific encryption keys, system 50 increases the difficulty with which an adversary may decrypt data stored by memory 12, thereby improving data security.

Use of encryption keys that are dependent on a memory location may provide a cryptographically secure algorithm for enciphering data stored by memory 12. The encryption technique that uses the memory location specific encryption keys may also help mitigate electronic tampering from at least two types of side channel attacks: simple power analysis and differential power analysis. A side channel attack may be, for example, an attack on system 50 based on information that is obtained from an analysis of the physical operation of system 50, such as the power consumed by system 50 during its operation and/or the sounds generated by system 50 during its operation. Side channel attacks may compromise the security of electrical devices (e.g., an ASIC, FPGA or another semiconductor device).

Simple power analysis is a side channel attack which involves visual examination of the power consumption (e.g., the current used) of an electrical device (e.g., system 50) over time. The electrical device may consume different amounts of power consumption as it performs different operations, such that variations in power consumption over time may evidence the different operations of the device. If the device is a cryptographic system that encrypts stored data, an adversary may be able to extract encryption keys from the power consumption profiles. Within some cryptographic systems, the unique power profiles may alert the adversary to the cryptographic standard being used. For example, systems that encrypt data using the Data Encryption Standard (DES) use 16 rounds, which are 16 identical stages of processing (e.g., transforming) used to convert plain data into ciphered data. These rounds can easily be seen on a digital oscilloscope and may tip off the adversary to the implementation of the DES to encrypt the stored data. As another example, systems that encrypt data using the Advanced Encryption Standard (AES) may use 10, 12, or 14 rounds to convert plain data into ciphered data, depending on the selected key strength.

Differential power analysis is a side channel attack in which an adversary may extract an encryption key (or other secret keys) by analyzing their power consumption from the outside of an electrical device. Differential power analysis may be a more advanced form of power analysis compared to simple power analysis because an adversary may be able to compute intermediate values within cryptographic computations by statistically analyzing data collected from multiple cryptographic operations. Differential power analysis attacks may be successful when the adversary is able to accumulate a statistically significant quantity of power samples over repeated cryptographic encryption/decryption operations using the same encryption key.

Other types of side channel attacks include correlation power analysis and a template attack. Correlation power analysis is similar to differential power analysis, and may be a side channel attack in which an adversary may determine secret encryption keys by correlating instantaneous power consumption to predicted nominal power consumption values. A template attacked may be used by an adversary to evaluate noise emanating from an integrated circuit of system 50; the noise may be expected to follow a Gaussian distribution. The adversary may sample noise from system 50 and compare the sampled noise against a probabilistic noise profile, such can be used to reveal secret keys.

System 50 is configured to encrypt contents of memory 12 (also referred to herein as "data" stored by memory 12) using key generation module 56 and first encryption and decryption module 58. In addition, system 50 is configured to authenticate the contents of memory 12 with the aid of an authentication tag generated by second encryption and decryption module 60 and associated with the stored memory contents. As described above with respect to FIGS. 1-3, processor 54 may authenticate the contents of memory 12 using an authentication technique in which plaintext stored by memory 12 is encrypted with the aid of first encryption and decryption module 58 to generate cipher text, and also encrypted with the aid of second encryption and decryption module 60 (using a different encryption key than first encryption and decryption module 58) to generate an authentication tag.

In the example shown in FIG. 4, key generation module 56 is configured to generate a first encryption key with which first encryption and decryption module 58 encrypts and decrypts data stored by memory 12 to generate cipher text, where the first encryption key is unique to the location of memory 12 in which the data is stored. In addition, in the example shown in FIG. 4, key generation module 56 is configured to generate a second encryption key with which second encryption and decryption module 60 encrypts and decrypts data stored by memory 12 to generate an authentication tag, where the second encryption key is also unique to the location of memory 12 in which the cipher text associated with the authentication tag is stored. The cipher text and associated authentication tag may be generated by encrypting the same plaintext data word (or other data) with respective encryption keys. In other examples, only one of first or second encryption and decryption modules 58, 60 is configured to encrypt data stored by memory 12 using an encryption key that is unique to the location of memory 12 in which the data is stored.

Figure 5:
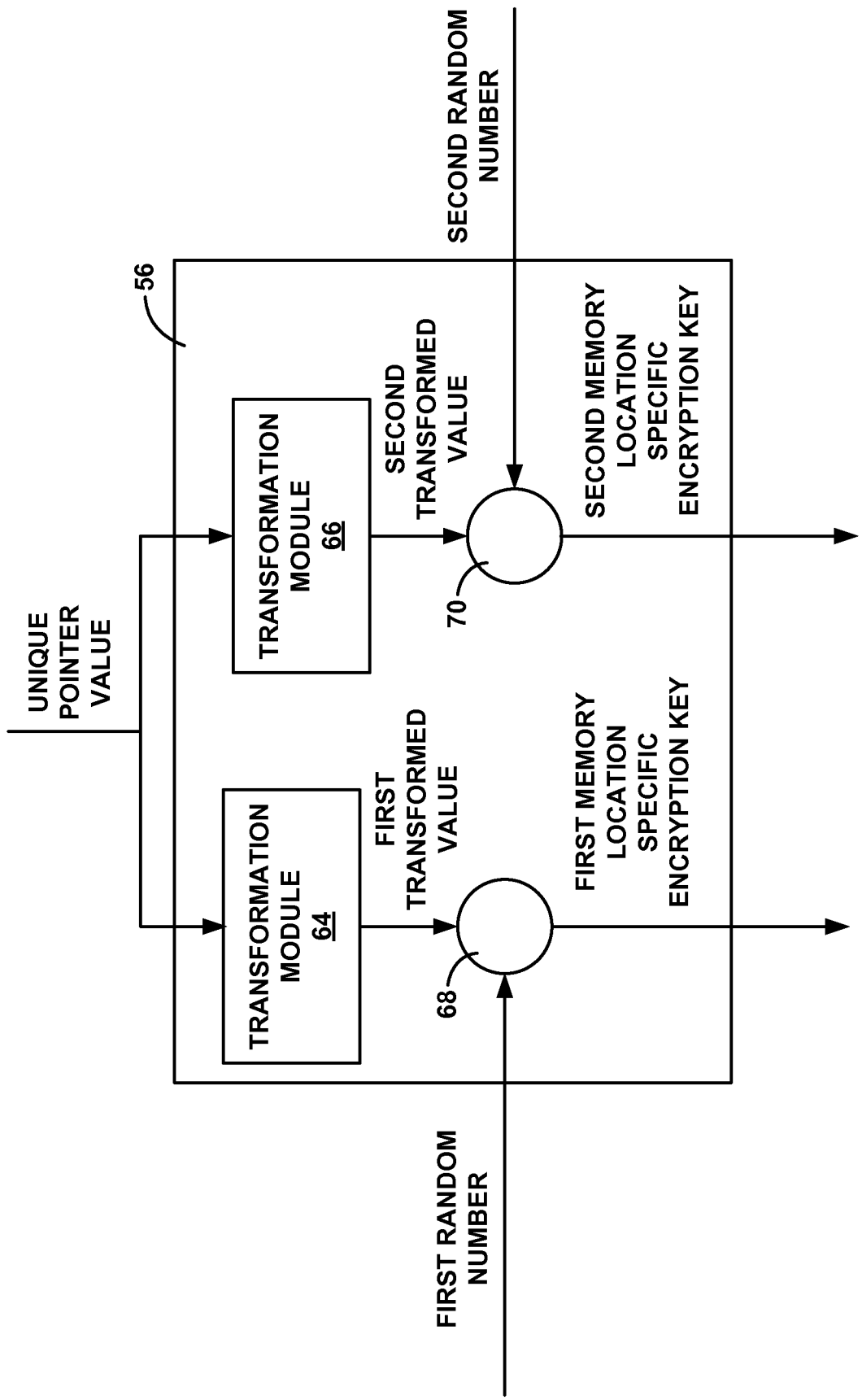
FIG. 5 is a functional block diagram of an example encryption key generation module, which is configured to generate unique encryption keys for generating cipher text and a respective authentication tag stored to a particular memory location based on a random number and a unique pointer value associated with the memory location.

Key generation module 56 is described in further detail with respect to FIG. 5. Encryption and decryption modules 58, 60 may, in some examples, cache recently determined encryption keys (e.g., a predetermined number of recently determined encryption keys), e.g., in respective page key cache memories.

As shown in FIGS. 4 and 5, key generation module 56 receives, as an input, a unique pointer value from processor 54, where the unique pointer value is unique to a location of memory 12. For example, the unique pointer value may be a memory address indicates the specific location of memory 12 at which data, including the cipher text and authentication tag, is to be stored. Key generation module 56 also receives, as an input, first and second random numbers. The random numbers may each have suitable size (e.g., bits). In one example, the random numbers each have 128 bits. In some examples, processor 54 generates the random numbers. In other examples, the random numbers may be generated by a processor external to system 14.

In some examples, system 50 stores random numbers in pairs, where one random number of the pair is used to generate the first encryption key and the second number of the pair is sued to generate a second encryption key. In some examples, a particular memory location of memory 12 may store both cipher text and authentication tag, where the cipher text is generated by encrypting data with a first encryption key generated using the unique pointer value associated with the memory location and a first random number, and the authentication tag is generated by encrypting the same data with a second encryption key that was generated using the unique pointer value and a second random number. Accordingly, in order for control system 52 to decrypt and authenticate the memory contents retrieved from the particular memory location, control system 52 must use a pair of random numbers to determine the encryption and decryption keys used to generate the cipher text and authentication tag.

In the example shown in FIGS. 4 and 5, the random numbers are generated internal to control system 52, such as by processor 54. For example, processor 54 may include a random number generator that generates the random numbers, e.g., using a random number generation algorithm. In these examples, one or both of the random numbers in a particular pair may also be referred to as a pseudo-random numbers. In other examples, processor 54 may generate one or both of the random numbers in a particular pair as truly random numbers, e.g., using one or more oscillators, radioactive decay models, or digital logic.

In some examples, the first and second random numbers used to generate the first and second encryption keys, respectively, are generated at some predetermined time, such as upon power-up of system 50, at regular intervals (e.g., once every hour, every day, or the like), or according to some other predetermined schedule with which processor 54 is programmed. As a result, over time and through the use of system 50, a plurality of random numbers may be used to encrypt the contents of memory 12 to generate cipher text, and a plurality of random numbers may be used to generate the authentication tags corresponding to the encrypted contents of memory 12. In some examples, the random numbers are generated ad hoc (e.g., not generated until the current power cycle, time, or the like), such that the random numbers are not predetermined by processor 54.

As shown in FIG. 4, in some examples, processor 54 may store the first and second random numbers in internal memory 62. If processor 54 generates the first and second random numbers, processor 54 may store the random numbers in internal memory 62 in response to generation of the random numbers. In examples in which the cipher text and associated authentication tag are stored at the same memory location (and, therefore, associated with the same unique pointer value), the first and second random numbers may be stored as a pair, such that the first and second random numbers are associated with the same memory location.

In the example shown in FIG. 4, system 50 uses a symmetric key based encryption algorithm for both the cipher text and the authentication tag. In a symmetric key based encryption algorithm, the same encryption key is used to encrypt data (e.g., the cipher text or authentication tag) stored by memory 12 and decrypt data (e.g., the respective one of the cipher text or authentication tag) read from memory 12. Thus, the first and second random numbers used to generate the first and second (unique) encryption keys for each memory location are stored by internal memory 62 for later retrieval by processor 54, e.g., so that system 50 (e.g., key generation module 56) can, at a later time, determine the encryption keys used to encrypt the cipher text and the authentication tag stored at the selected memory address in order to decrypt the cipher text and the authentication tag. These encryption keys may also be referred to as decryption keys.

In some examples in which processor 54 stores the first and second random numbers, processor 54 may associate information with the pair of random numbers that will later enable processor 54 to associate the pair of random numbers with a particular memory location. For example, processor 54 may store information that indicates during which power cycle data was written to the memory location or at which time encrypted data was written to the memory location, along with an indication of when each pair of stored random numbers was generated (e.g., an indication of the power cycle or day and time the random number was generated). Instead, or in addition, processor 54 may store in internal memory 62, a memory location and the random numbers used to generate the first and second encryption keys associated with the memory location at the time data was written to the memory location. Because memory 62 is internal to control system 52, the channels through which an adversary may obtain the stored random numbers may be minimized compared to if the random numbers are stored by an external memory. However, in some examples, processor 54 may store the random numbers in a memory external to control system 52. For example, the random numbers may be stored in an external memory in a manner that makes it difficult for an adversary to associate a particular pair of random numbers with a particular memory location.

In some examples in which processor 54 generates the first and second random numbers at predetermined times (e.g., upon power-up of system 50), memory 12 may be cleared and a new set of information may be stored by memory 12 at each of those predetermined times (e.g., at every power-up cycle). For example, memory 12 may be random access memory that only stores information for use during a single power-up cycle, which may, in some examples, correspond to a single mission of a larger system in which system 50 is incorporated. In these examples, only one encryption key (and random number) is used to encrypt contents of memory 12 and another encryption key (and respective random number) is used to generate the authentication tags that are used to authenticate the contents of memory 12. Less storage may be required to store the information (e.g., the pair of random numbers used to generate the first and second encryption keys) needed to decrypt and authenticate the contents of memory 12. However, in other examples, memory 12 retains data between multiple random number generation cycles (e.g., power-up cycles) and internal memory 62 may be needed to store the encryption keys or information used to generate the encryption keys (e.g., random number pairs) so that data stored by memory 12 can be later decrypted and authenticated.

FIG. 5 is a functional block diagram of an example encryption key generation module 56, which is configured to generate a unique first encryption key for data stored to a particular memory location based on a first random number and a unique pointer value associated with the memory location. Encryption key generation module 56 is also configured to generate a unique second encryption key for authenticating the data stored to the particular memory location based on a second random number and then unique pointer value associated with the memory location. As shown in FIG. 5, a unique pointer value associated with the memory location, such as a memory address or a unique packet identifier for a packet of data sent over a communication channel (e.g., a wired or wireless communication channel), undergoes a first transformation, which is shown as being implemented by transformation module 64 of key generation module 56 and a second transformation, which is shown as being implemented by transformation module 66 of key generation module 56. Transformation modules 64, 66 may be implemented by hardware, software, firmware or any combination thereof and may, in some examples, by a common module.

Transformation modules 64, 66 each implements any suitable transformation algorithm (e.g., a transformation function) that results in a unique value. In some examples, transformation modules 64, 66 implement different transformation techniques algorithms, such that they output different values. The transformation algorithms can be selected such that there is one-to-one mapping of input value (e.g., the unique pointer value) to output value (e.g., the transformed value), and such that there is no aliasing (e.g., such that two or more input values do not result in the same output value). In some examples, one or both of the selected transformation algorithms are non-linear, and in these examples, no proportional relationship exists between the value input to a particular transformation algorithm and the value output from the algorithm. Using these parameters and other parameters, the selected transformation algorithms for implementation by transformation modules 64, 66 may be selected such that they are resistant to linear and differential cryptanalysis, as well as algebraic attacks.

An example of a non-linear transformation algorithm that one or both transformation modules 64, 66 may implement to transform the unique pointer value includes a Substitution-box (also referred to as an "S-box"), which performs substitutions between an input and an output. The substitutions performed by transformation module 64 may be different than that performed by transformation module 66, such that they transformation modules 64, 66 output different transformed values for the same input (i.e., the unique pointer value in the example shown in FIG. 5). In some examples, the Substitution-box is a look-up table that associates a pointer value with a transformed value. Instead of, or in addition to, the Substitution-box, in some examples, one or both transformation modules 64, 66 may transform the unique pointer value using an independent crytopographic algorithm, such as using AES, RC5, or DES algorithms, or any combination thereof. However, the transformation algorithms implemented by transformation modules 64, 66 to transform a unique pointer value to a respective transformed pointer value is not necessarily cryptographic in all examples.

Transformation module 64 outputs a first transformed value, which results when the unique pointer associated with the memory location undergoes a first transformation by transformation module 64. In addition, transformation module 66 outputs a second transformed value, which results when the unique pointer associated with the memory location undergoes the second transformation by transformation module 66. The first and second transformations are different in some examples.

In order to generate the first encryption key, the first transformed value is combined with the first random number via combination function 68, as shown in FIG. 5, and the result of this combination is a first memory location specific encryption key. In addition, in order to generate the second encryption key, the second transformed value is combined with the second random number (different than the first random number) via combination function 70, as shown in FIG. 5, and the result of this combination is a second memory location specific encryption key.

First and second combination functions 68, 70 may be the same in some examples, and may be different in other examples. Combination functions 68, 70 can be any suitable combination function, such as a bitwise XOR function. In some examples, combination functions 68, 70 are each a type of function in which all of the bits of the input affect the bits of the output. In some examples, combination functions 68, 70 are each more than just a logic gate, and can each be, for example, a non-linear function, a hash function, a cryptographic function, a look-up table, and the like. In some examples, combination functions 68, 70 are selected such that all of the bits of the input affect the bits of the output.

In some examples, key generation module 56 combines the pointer value with a first transformation random value before passing the value through the transformation module 64 to generate the first transformed value. The first transformation random value can be the same as, or different than, the first random number combined with the transformed value, which can be referred to as a first "combination" random number for ease of description. In addition, in some examples, key generation module 56 combines the pointer value with a second transformation random value before passing the value through the transformation module 66 to generate the second transformed value. The second transformation random value can be the same as, or different than, the second random number combined with the transformed value, which can be referred to as a second "combination" random number for ease of description. The first and second transformation random values may be the same in some examples, and may be different in other examples.

As with the first and second combination random numbers, in some examples, processor 54 (or another processor internal to or external to control system 52) may generate the first and second transformation random values at some predetermined time, such as upon power-up of system 50, at regular intervals (e.g., once every hour, every day, or the like), or according to some predetermined schedule with which processor 54 is programmed. The timing with which the first and second transformation random number are generated may be the same as, or different than, the timing with which the first and second combination random numbers are generated.

In other examples of key generation module 56 shown in FIG. 5, the unique pointer value only undergoes one transformation by one transformation module prior to being combined with first and second random numbers to generate the first and second memory location specific encryption keys, respectively.

Generating encryption keys using random numbers may provide another safeguard against the breaking (e.g., reverse engineering) of the encryption keys used to encrypt and authenticate data stored by memory 12 in addition the safeguard provided by utilizing encryption keys unique to a specific memory location (e.g., based on the unique pointer value). Because the random numbers periodically change, e.g., with every power-up cycle, with every hour, or according to another schedule, even if one set of encryption keys used to encrypt and authenticate data stored by memory 12 is cracked and the pair of random numbers are determined, key generation module 56 implements different key values to generate the encryption keys based on the time at which the encryption keys are generated.

Even if an adversary gains knowledge of the pair of random numbers used to generate the first and second encryption keys, the adversary may only use these numbers to determine the encryption keys for the data encrypted and stored in memory 12 at the same time the respective pair of random numbers is used (e.g., the same power-up cycle, the same time, etc.). The adversary may not have access to such timing information. Moreover, even if the pair of random number is known, the adversary must also determine, for each memory location, the transformation algorithms used to transform the unique pointer value, the memory location, and the combination functions used by key generation module 56 to generate the first and second encryption keys. For at least these reasons, an encryption key that uses both a random number and a unique pointer value to encrypt data stored to a specific memory location may provide a cryptographically secure encryption technique.

Key generation module 56 outputs the first memory location specific encryption key and the second memory location specific encryption key, as shown in FIG. 4, which are received by encryption and decryption modules 58, 60, respectively, as an input. Encryption and decryption module 58 is configured to encrypt data to be written to memory 12 using the first location specific key encryption key generated by key generation module 56, thereby generating cipher text. In addition, encryption and decryption module 60 is configured to encrypt data to be written to memory 12 using the second location specific key encryption key generated by key generation module 56, thereby generating an authentication tag. Encryption and decryption modules 58, 60 may encrypt the data prior to processor 54 writing the data to memory 12 (directly or indirectly via module 20). Encryption and decryption modules 58, 60 may be configured to encrypt and decrypt data using any suitable technique, such as by implementing an AES algorithm, a DES algorithm, an RC5 algorithm, or any combination thereof.

In some examples, one or both encryption and decryption modules 58, 60 implements a block cipher algorithm to encrypt data, such that data is processed predetermined word sizes. For example, if both encryption and decryption modules 58, 60 utilize an AES algorithm, plain or cipher text is processed by each of the modules 58, 60 in 128-bit word sizes (e.g., a 128-bit word is input to and output from each of the encryption and decryption modules 58, 60). In some examples, the cipher text and an associated authentication tag are stored in different blocks of memory 12. In other examples, cipher text (output from encryption and decryption module 58) and an associated authentication tag (output from encryption and decryption module 60) are stored together, e.g., in a common block of memory 12. In these examples, processor 54 may access memory 12 in word sizes that are based on the combined word size that results when the word size which encryption and decryption module 58 encrypts data is added with the word size with which encryption and decryption module 60 encrypts data. Because the combined word size may be different than the size of the memory locations, in some examples, processor 54 may select a unique pointer value that spans more than one memory location. However, the selected pointer value may still be unique to the group of memory locations (e.g., may be the address of one location in the group). In this way, data stored by memory 12 may still be enciphered and authenticated using multiple encryption keys that are based on a memory location at which the data is stored.

A unique pointer value may span two physical memory locations in order to accommodate the combined word size of cipher text output by first encryption and decryption module 58 and the authentication tag output by second encryption and decryption module 60. For example, if memory 12 is configured as 64 bit RAM, a 128-bit encrypted word (i.e., the cipher text) output by encryption and decryption module 58 and a 128-bit encrypted word (i.e., the authentication tag) output by encryption and decryption module 60 may be stored in four contiguous locations within memory 12. A single pointer value may then be used to encrypt and decrypt the data; processor 54 may select the pointer value that is used to generate the encryption key using some predetermined algorithm (e.g., the lowest pointer value or the highest pointer value). A single pointer may be used to identify two encrypted words of any size, if the sizes are known by the system and the words are stored in contiguous locations of the memory.

Encrypting data stored by memory 12 with one or more encryption keys that are generated based on a unique pointer value associated with a location in memory 12 in which the data is stored and a random value may be more cryptographically secure than using one solitary key to encrypt and decrypt large blocks of data. Because each data word (e.g., cipher text, an authentication tag, or both) stored by memory 12 is associated with its own unique encryption key, an adversary cannot simply take large blocks of data and attempt to break the encryption numerically. Instead, the adversary must determine the boundaries between contiguous pieces of data (e.g., between cipher text and the associated authentication tag or between one set of cipher text and respective authentication tag and another set of cipher text and respective authentication tag) enciphered with different encryption keys, and solve each location specific encryption key.

Moreover, the use of a random number in addition to, or instead of, a master key value (discussed in further detail below with respect to FIG. 9) may further complicate the breaking of the encryption key implemented by system 50 because an adversary cannot simply work backwards through a cryptographic transformation to determine a master key value that may be used to break the encryption keys for data words stored by memory 12, where each of the data words may be cipher text, an authentication tag, or both. Instead, multiple random numbers are used to encrypt data stored by memory 12, such that an adversary must figure out each of the random values and associate each of the random values with a particular data word in order to break the encryption. The manner in which the random values are generated may be difficult to ascertain to the adversary. For example, if the first and second random numbers are unique to the power-up cycle of system 50, the adversary must be able to determine when a particular data word was written to memory 12, the power-up cycle during which the data word was written to memory 12, whether the data word is cipher text or an authentication tag, and the random number associated the cipher text or authentication tag, and further associated with the power-up cycle in order to determine a random number that was used to generate one of the encryption keys associated with the location in memory 12 in which the data word is stored.

The encryption technique described herein that uses the unique pointer value associated with a location in memory 12 to generate an encryption key for a particular data word (whether it be cipher text or an authentication tag) stored in memory 12 at the location may also reduce the overhead associated with the encryption/decryption processing compared to other types of systems that may use multiple encryption keys to encrypt data stored by a memory. For example, in examples in which the cipher text and authentication tag are associated with a common memory location, sets of first and second encryption keys unique to respective locations in memory 12 may be determined relatively quickly by key generation module 56, which may eliminate the need to store each set generated encryption keys in an internal look up table. While the random numbers used to generate the first and second encryption keys of each set may be stored, the random numbers may be less cumbersome to store and retrieve than encryption keys.

In some cases, however, such as during the encryption and/or decryption of large blocks of data using symmetric cryptographic algorithms that use a key schedule (e.g., AES, DES, or RC5), key generation module 56 may determine a plurality of sets of first and second encryption keys at once (e.g., during a single round of data ciphering or deciphering), which may impose a performance penalty (e.g., a time delay) on system 50. A key expansion algorithm may be implemented to determine the key schedule, where the key expansion algorithm is used to determine the encryption keys for a particular round of data ciphering or deciphering. The penalty may be more pronounced during some decrypt operations in which one or both encryption and decryption modules 58, 60 uses a key schedule that is unrolled and then used in reverse, such that the last schedule key entry is used first. In some encryption operations, encryption and decryption modules 58, 60 may each use a respective key schedule in order so the key schedule can be expanded concurrent with the encryption process, which may speed up on the encryption process compared to the decryption process.

As discussed above, a differential power analysis is a side channel attack that some adversaries may implement in order to obtain information that may be used in attempts to break an encryption key. When one or both encryption and decryption modules 58, 60 implement a memory location specific encryption technique described herein with a symmetric cryptographic algorithm that use a key schedule (the algorithm with which a plurality of encryption keys are determined), the susceptibility of system 50 to differential power analysis may be reduced compared to systems that do not use memory location specific encryption keys. A differential power analysis side channel attack may be performed by collecting a statistically significant amount of enciphered data, and correlating the sampled data with concurrently taken power readings of system 50. Once the power data is accumulated, the adversary may make statistical guesses about the values within the key schedule. Successfully determining the key schedule may allow the adversary to perform the key schedule algorithm in reverse in order to determine the master key value used to generate the encryption keys, and, in some encryption systems, once the master key value is determine, the encryption for all the stored data may be determined. The differential power analysis side channel attack may be more effective when repeated power readings of system 50 can be taken with the same key over along period of time.

In contrast to a system that uses the same master key value to encrypt large blocks of data, a memory location specific encryption technique described herein uses an encryption key that is based on a unique pointer value for a particular memory location to generate cipher text, such that the encryption key used to generate cipher text is unique for each memory location. The unique non-linear address translation function implemented by key generation module 56 can be used to transmute a key schedule. As a result, the key schedule may be different for any two locations in memory 12 (e.g., for any two pointer values), and, due to the nature of the transformation under which the unique value undergoes, no two contiguous locations in memory 12 may have similar key schedules.

The encryption keys specific to a memory location may force an adversary to collect differential power analysis traces associated with specific memory locations in order to solve for the set of unique encryption keys used to encrypt the data stored at the memory location, which increases the complexity of the attack. Collection of the requisite number of samples to perform differential power analysis may become cumbersome, such as in situations in which the adversary does not have access to the entity initiating the operations. For example, an embedded processor may only access external memory 12 as a result of a cache miss, such that collecting a sufficient number of samples to perform the differential power analysis may take a relatively long amount of time. In some applications of system 50, it may be possible to reduce the number of accesses by processor 54 to each memory address, such that the number of power tracings associated with the address is below the threshold required to effectively perform differential power analysis. Moreover, not only must the adversary collect differential power analysis traces associated with a particular memory location, but the adversary must also be able to differentiate between the first encryption key used to generate the cipher text stored at the particular memory location and the second encryption key used to generate the authentication tag stored at the particular memory location. These added complications to a differential power analysis performed by an adversary can improve data security.

Figure 6:
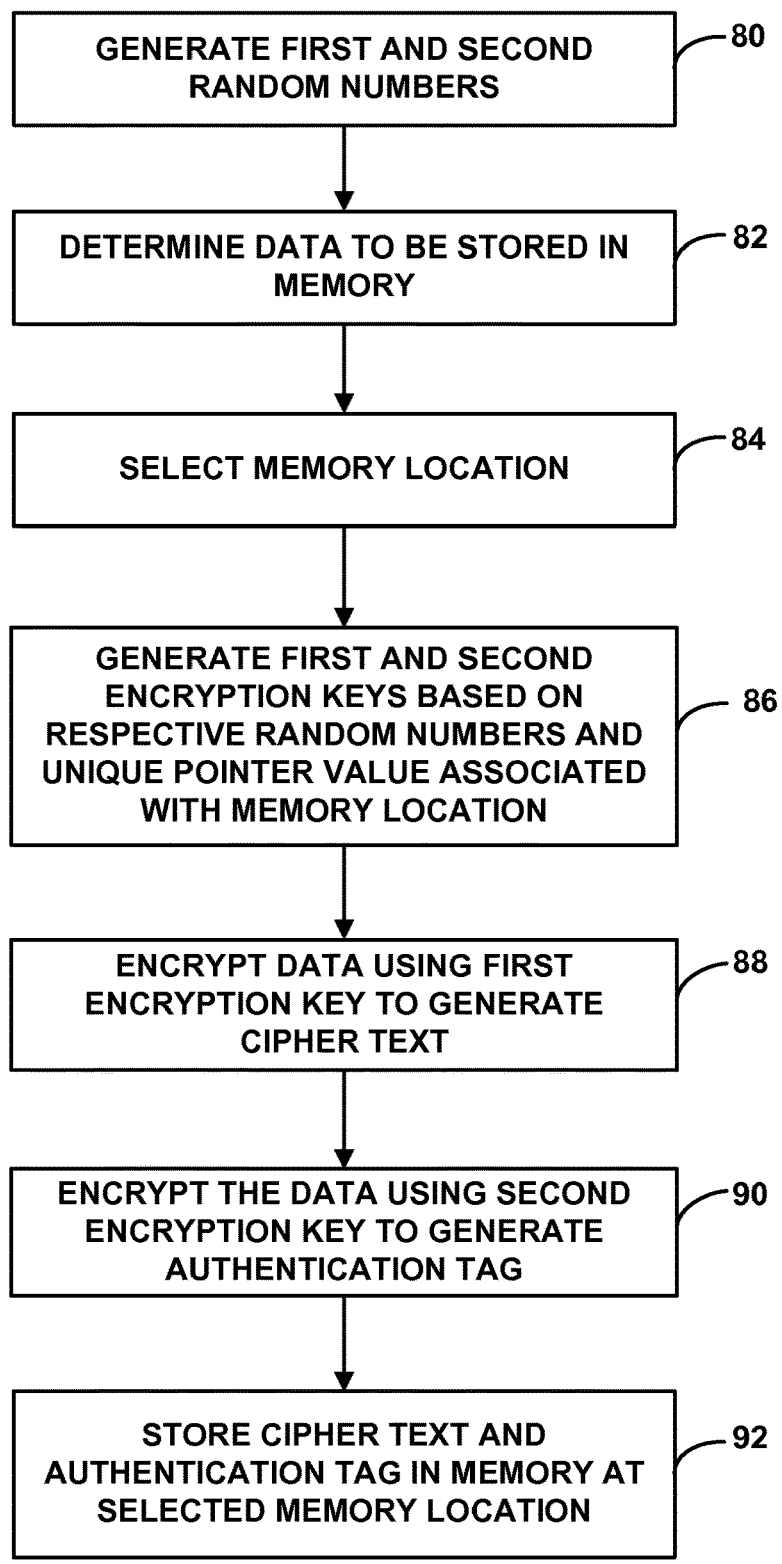
FIG. 6 is a flow diagram of an example technique for encrypting data stored at a particular location in a memory using a first encryption key unique to the memory location and generating an authentication tag for authenticating the data stored at the particular location in the memory using a second encryption key unique to the memory location.

FIG. 6 is a flow diagram of an example technique with which system 50 may encrypt data stored by memory 12. The technique shown in FIG. 6 may be implemented, for example, during a write operation controlled by processor 54 of system 50 or a processor of another device. While FIG. 6 is described with respect to system 50 (FIG. 4), in other examples, the technique shown in FIG. 6 can be implemented by another system alone or in combination with system 50. In accordance with the technique shown in FIG. 6, processor 54 generates a set of first and second random numbers (80). As discussed above, processor 54 may periodically generate the first and second random numbers and may also store the random numbers in internal memory 62 for later retrieval. Processor 54 may also determine data to be stored in memory 12 (82), and, in some examples, may output the data via a data bus to data buffer 24. The data may be referred to as plaintext prior to being encrypted. Processor 54 may determine the data to be stored in memory 12 by, for example, receiving the data from an external source (e.g., another electrical device or user input), or generating the data.

Processor 54 selects the memory location for storing the determined data (84), e.g., based on instructions stored by internal memory 62 and executed by processor 54. The instructions may dictate, for example, the order in which memory 12 is written to. Processor 54 may generate the set of first and second random numbers (80), determine the data to be stored in memory 12 (82), and select the memory location (84) in any particular order. Moreover, in other examples, another component may control one or more of these actions independently or in combination with processor 54.

In the technique shown in FIG. 6, key transformation module 56 generates a first encryption key that is unique to the selected memory location based on the first random number and a unique pointer value associated with the memory location and generates a second encryption key that is unique to the selected memory location based on the second random number and the unique pointer value associated with the memory location (86). As discussed above, first and second transformation modules 64, 66 (FIG. 5) may each transform the unique pointer value, e.g., via a non-linear transformation algorithm, and combine the transformed pointer value with the respective one of the first or second random numbers to generate the first and second encryption keys, respectively. In some examples, key generation module 56 may be configured to combine the unique pointer value with one or more transformation random values before passing the value through the transformation modules 64, 66 to generate the first and second transformed values. The one or more transformation random values can be the same as, or different than, the first and second random numbers combined with the first and second transformed pointer value, respective.

After the encryption keys are generated, under the control of processor 54, first encryption and decryption module 58 encrypts the data (determined by processor 54) using the first encryption key to generate cipher text (88). In addition, under the control of processor 54, second encryption and decryption module 60 encrypts the data using the second encryption key to generate an authentication tag for the cipher text (90). In some examples, data buffer 24 provides the plaintext to be encrypted to encryption and decryption modules 58, 60. In other examples, processor 54 provides the plaintext directly to encryption and decryption modules 58, 60. System 50 stores the cipher text and respective authentication tag in memory 12 at the selected memory location (92).

Figure 7:
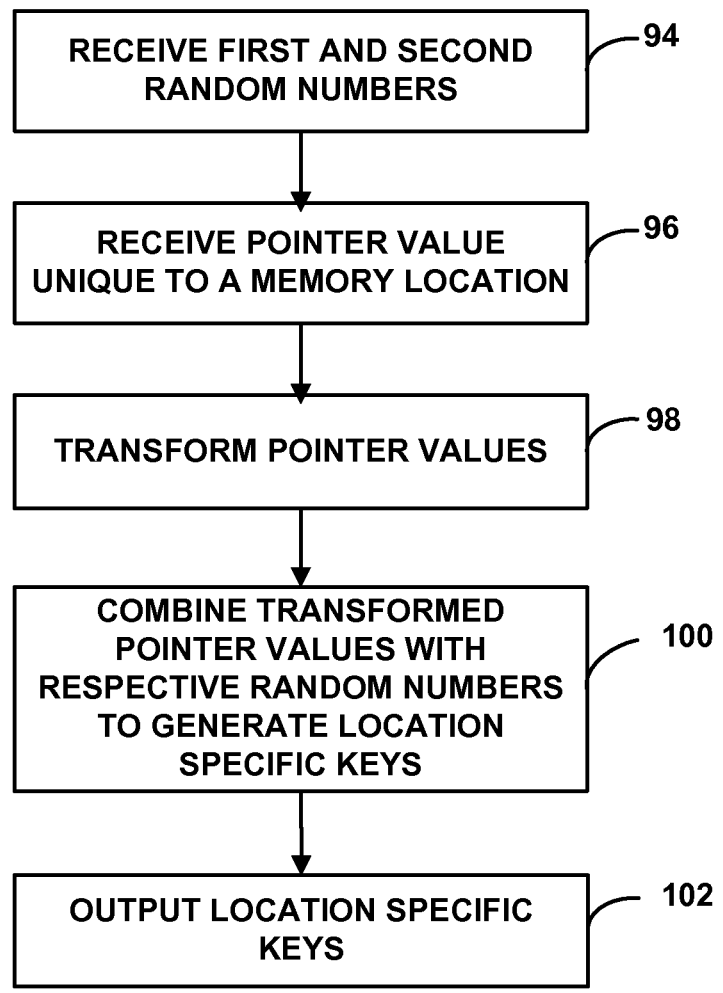
FIG. 7 is a flow diagram of an example technique for generating first and second encryption keys based on respective random numbers and a unique pointer value associated with a particular memory location.

FIG. 7 is a flow diagram of an example technique with which key generation module 56 may generate a set of first and second encryption keys used to generate cipher text and an associated authentication tag. While FIG. 7 is described with respect to key generation module 56 (FIGS. 4 and 5), in other examples, the technique shown in FIG. 7 can be implemented by another system alone or in combination with key generation module 56. In addition, while FIG. 7 describes an example in which key generation module 56 generates first and second encryption keys that are unique to a location of memory 12, in other examples, key generation module 56 may generate only one encryption key that is unique to a location of memory 12 (e.g., only one of the first encryption key used to generate the cipher text or the second encryption key used to generate the authentication tag).

In accordance with the technique shown in FIG. 7, key generation module 56 receives first and second random numbers (94) and receives the pointer value unique to a memory location to which data encrypted using the encryption key generated by key generation module 56 is to be stored (96). Key generation module 56 may, for example, receive the random numbers and unique pointer value from processor 54 or internal memory 62. After receiving the unique pointer value, first transformation module 64 (FIG. 5) of key generation module 56 transforms the pointer value, thereby generating a first transformed pointer value and second transformation module 66 (FIG. 5) of key generation module 56 transforms the pointer value to generate a second transformed pointer value (98). The transformation algorithms (also referred to herein as transformation techniques) implemented by transformation modules 64, 66 may be, for example, a non-linear transformation algorithm to transform the pointer value. In some examples, first and second transformation modules 64, 66 implement the same transformation algorithm, while in other examples, first and second transformation modules 64, 66 implement different transformation modules.

Key generation module 56 may combine the transformed pointer values with respective random numbers to generate the first and second memory location specific encryption keys (100). Key generation module 56 may then output the memory location specific encryption keys, e.g., to a respective one of the first and second encryption and decryption module 58, 60 (102).

Other techniques that utilize a unique pointer value and a random number to generate an encryption key are contemplated. For example, as discussed above, prior to transforming the unique pointer value, key generation module 56 may combine the unique pointer value with a transformation random number (the same as or different than the random number combined with the transformed pointer value) (58).

Figure 8:
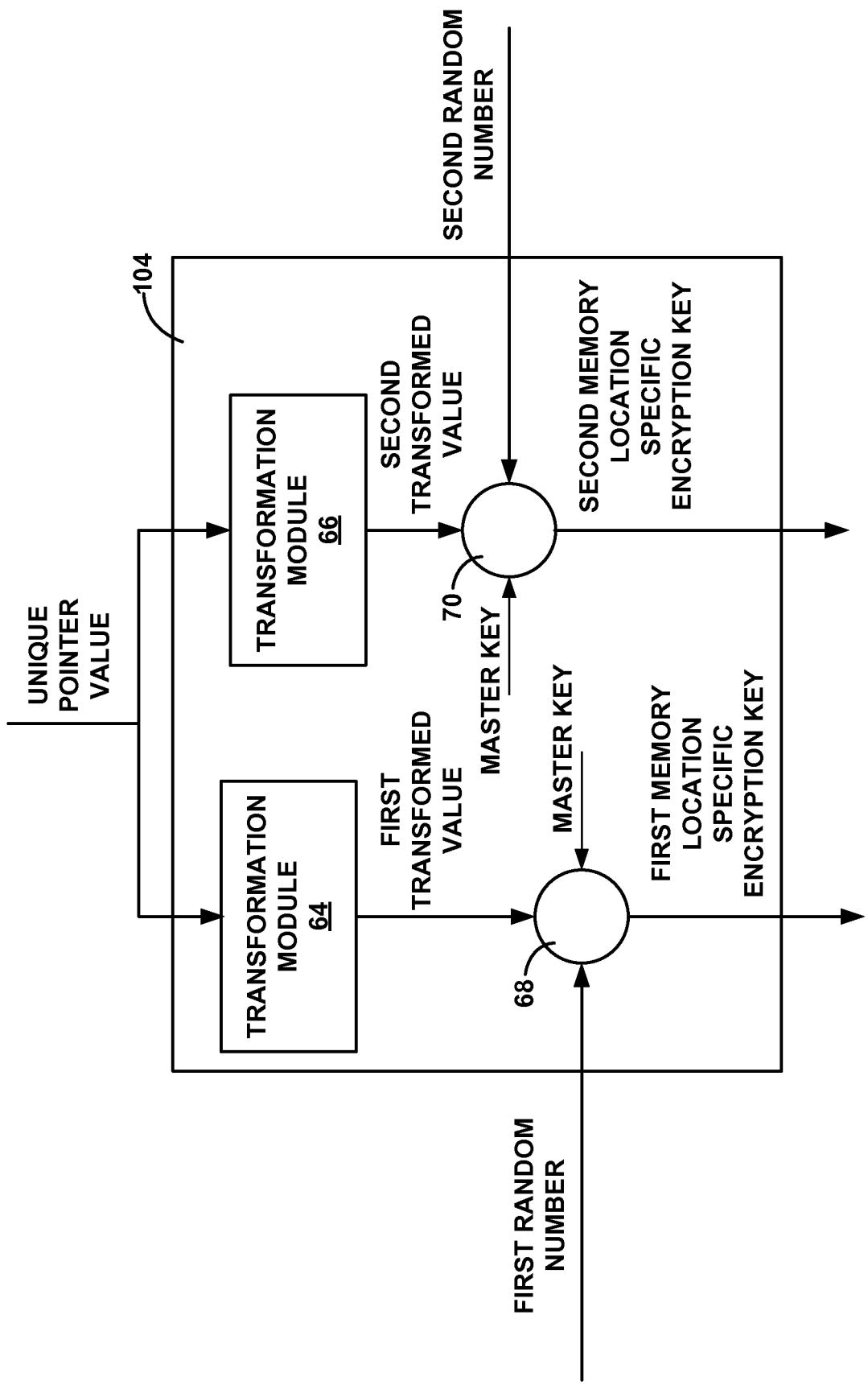
FIG. 8 is a functional block diagram of an example encryption key generation module that is configured to generate a set of first and second unique encryption keys for data stored to a particular memory location based on random numbers, a master key value, and a unique pointer associated with the memory location.

In some examples, key generation module 56 of control system 52 may be configured to generate one or both of the first and second encryption keys using a master key value in addition to or instead of a random number. An example of such a key generation module 104 is shown in FIG. 8. Key generation module 104 is similar to key generation module 56 (FIGS. 4 and 5), but is configured to generate first and second encryption keys based on a unique pointer value, a respective random number, and a master key value. In some examples, processor 54 provides the unique pointer value, master key value, and random number to key generation module 104. In other examples, these values may be provided to key generation module 104 from another component, such as directly from internal memory 62 or from another processor.

As described above with respect to FIG. 5, transformation modules 64, 66 are each configured to implement any suitable transformation algorithm to transform the unique key value into a unique transformed value. Transformation modules 64, 66 each output a transformed value, which is then combined with a respective random number and the master key value via the respective combination functions 68, 70 to generate a memory location specific encryption key. As with the example shown in FIG. 5, in some examples, key generation module 104 may be configured to combine the unique pointer value with a random value before passing the values through transformation modules 64, 66 to generate the first and second transformed values. The transformation random value can be the same as, or different than, the first and second random numbers combined with the respective one of the first and second transformed pointer values.

Key generation module 104 outputs the first and second memory location specific encryption keys, which are then received by first and second encryption and decryption modules 58, 60, respectively, as an input. Encryption and decryption module 58 is configured to encrypt data to be written to memory 12 using the first location specific encryption key generated by key generation module 104 and encryption and decryption module 60 is configured to encrypt data to be written to memory using the second location specific encryption key.

In some examples, key generation module 104 may use the same master key value to generate the first and second encryption keys, while in other examples, key generation module 104 may use different master key values. In addition, in some examples, key generation module 104 may generate only one of the first or second encryption keys using both a master key value and a random number. In this example, the other one of the first or second encryption keys may be generated using only a random number or only a master key value.

In the example shown in FIG. 8, for each first encryption key generated by key generation module 104, the master key value remains the same for each first encryption key generated by key generation module 104, unlike the first random number. The master key provides an additional complexity to the generation of the first encryption key, and provides another value an adversary must determine in order to crack the first encryption key. Similarly, unlike the second random number, for each second encryption key generated by key generation module 104, the master key value remains the same for each generated second encryption key. In some examples, the one or more master key values can be stored by internal memory 62.

Figure 9:
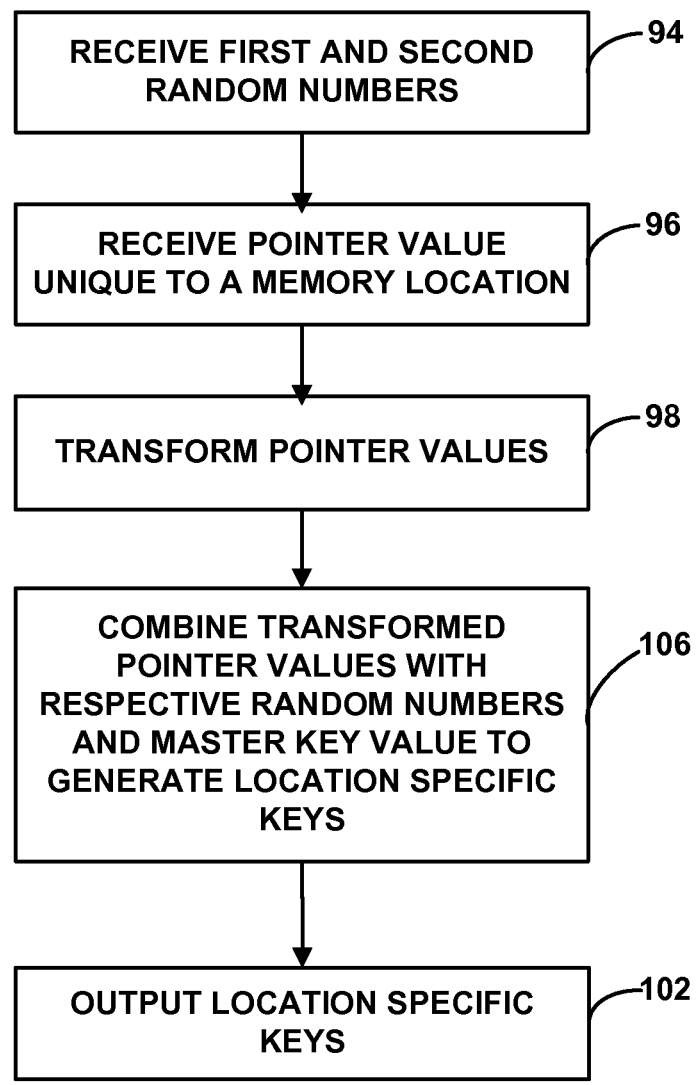
FIG. 9 is a flow diagram of an example technique with which the key generation module of FIG. 8 may generate first and second encryption keys based on a unique pointer value associated with a respective memory location.

FIG. 9 is a flow diagram of an example technique with which key generation module 104 may generate a set of first and second encryption keys for encrypting and authenticating data stored at a particular location in memory 12 based on a unique pointer value associated with the memory location, random numbers, and a master key value. While FIG. 9 is described with respect to key generation module 104 (FIG. 8), in other examples, the technique shown in FIG. 9 can be implemented by another system alone or in combination with key generation module 104.

The technique shown in FIG. 9 is similar to that shown in FIG. 7. However, after key generation module 104 receives the set of first and second random numbers (94), receives the pointer value unique to a memory location to which data encrypted using the encryption key generated by key generation module 104 is to be stored (96), and transforms the pointer values (98), key generation module 104 may combine the transformed pointer values with the respective random numbers and a master key value to generate the set of first and second memory location specific encryption keys (106). Key generation module 104 may then output the memory location specific encryption keys, e.g., to encryption and decryption modules 58, 60 (102).

While FIG. 9 illustrates an example in which a single master key value is used to generate the first and second encryption keys of the set, in other examples, the first and second encryption keys may be generated using different master key values.

Figure 10:
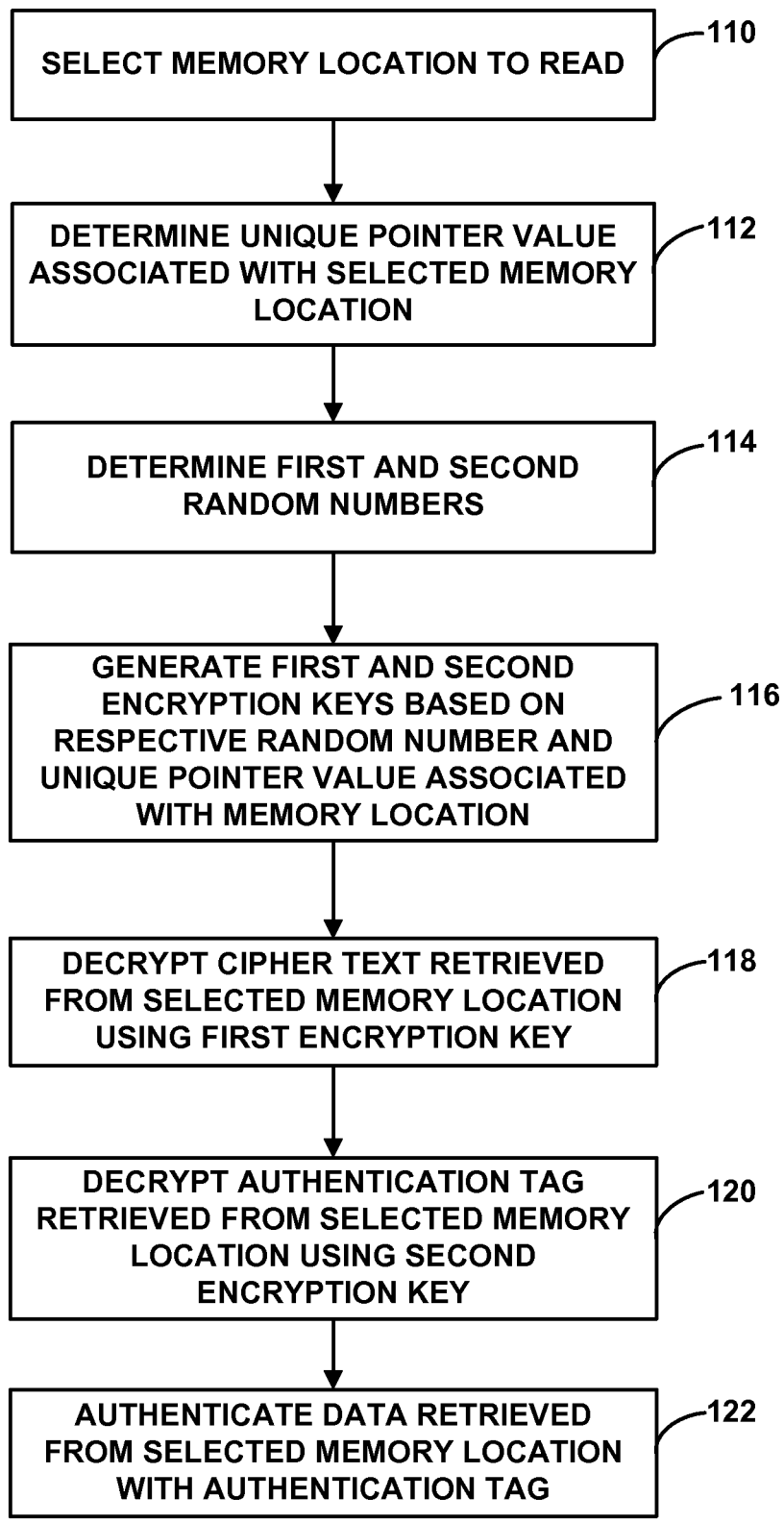
FIG. 10 is a flow diagram of an example technique with which data stored by memory 12 may be decrypted.

FIG. 10 is a flow diagram of an example technique with which data stored by memory 12 may be decrypted and authenticated. The technique shown in FIG. 10 may be implemented, for example, during a read operation controlled by processor 54 of system 50 or a processor of another device. While FIG. 10 is primarily described with reference to system 50 (FIG. 4), in other examples, the technique shown in FIG. 10 may be implemented by another system.

In accordance with the technique shown in FIG. 10, processor 54 selects a location of memory 12 from which data is to be read (110). Processor 54 may select the memory location in response to, for example, receiving instructions (e.g., from a user or another electric device) requesting the data stored at the memory location. Processor 54 may also determine the unique pointer value associated with the selected memory location (112), such by determining the memory address or the packet identifier of the packet used to transmit the data to memory 12 when the data was written to memory 12.

In order to decrypt the data stored by memory 12 at the selected location, processor 54 may need to re-determine the first and second encryption keys. As part of this process, processor 54 may determine the set of first and second random numbers that were implemented by key transformation module 56 (or key transformation module 104) at the time the data was written to the selected memory location (114). In some examples, processor 54 determines the random numbers by accessing internal memory 62 and determining the set of first and second random numbers that is associated with the selected memory location in internal memory 62. In other examples, processor 54 may determine the time at which the data was written to the memory location and determine the first and second random numbers associated with that time (e.g., based on information stored by internal memory 62). As another example, processor 54 may determine the power cycle during which the data was written to the memory location and determine the first and second random number associated with that power cycle (e.g., based on information stored by internal memory 62). Other techniques may be used to determine the random numbers used by key transformation module 56 (or module 104) at the time the data was written to the selected memory location.

After determining the random numbers, processor 54 may provide the random numbers and unique pointer value to key generation module 56 (or module 104), which may then generate the first and second encryption keys based on the first and second random numbers, respectively, and the unique pointer value, e.g., using the technique described with respect to FIG. 5 or FIG. 8 (116). Key generation module 56 (or module 104) may output the first encryption key to encryption and decryption module 58 and output the second encryption key to encryption and decryption module 60. In the example technique shown in FIG. 10, first encryption and decryption module 58 decrypts the cipher text retrieved from the selected memory location using the first encryption key (118), and second encryption and decryption module 60 decrypts the authentication tag retrieved from the selected memory location using the second encryption key (120). Processor 54 may authenticate the cipher text retrieved from the selected memory location using the authentication tag (122), e.g., using the technique described with respect to FIG. 3, in which the plaintext generated by decrypting the cipher text is compared to the plaintext generated by decrypting the authentication tag.

In examples in which the contents of memory 12 are encrypted based on the unique pointer value and a random number, processor 16 may use a pointer value unique to the memory address used by the internal memory bus of control system 52 or a pointer value unique to the translated external memory address to encrypt the memory contents. Any suitable translation algorithm may be used to translate the memory address.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described encryption, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. A method comprising:
   generating a first encryption key for encrypting data to be stored by a memory at a selected memory location;
   generating a second encryption key for encrypting the data to be stored by the memory at the selected memory location, wherein generating the second encryption key is not based on the first encryption key, and wherein generating the first encryption key is not based on the second encryption key;
   encrypting the data to be stored by the memory using the first encryption key, wherein encrypting the data using the first encryption key generates cipher text that is decryptable back into the data using the first encryption key;
   encrypting the data to be stored by the memory using the second encryption key different than the first encryption key, wherein encrypting the data using the second encryption key generates an authentication tag that is decryptable back into the data using the second encryption key; and
   storing the cipher text and authentication tag in the memory.

2. The method of claim 1, further comprising:
   after storing the cipher text and authentication tag in the memory, authenticating contents of the memory, wherein authenticating the contents of the memory comprises:
   decrypting the cipher text using the first encryption key to generate first plaintext;
   decrypting the authentication tag using the second encryption key to generate second plaintext; and
   comparing the first and second plaintext.

3. The method of claim 2, wherein decrypting the cipher text and decrypting the authentication tag comprises decrypting the cipher text and authentication tag in parallel.

4. The method of claim 2, wherein decrypting the cipher text and decrypting the authentication tag comprises decrypting the cipher text and decrypting the authentication tag at different times.

5. The method of claim 2, wherein comparing the first and second plaintext comprises determining the first and second plaintext do not match, the method further comprising generating a tamper indication in response to determining the first and second plaintext do not match.

6. The method of claim 1, further comprising:
   selecting the memory location within the memory;
   wherein generating the first encryption key for encrypting the data to be stored by the memory at the selected memory location comprises generating the first encryption key based on a first random number and a pointer value that is unique to the memory location and associated with the memory location; and
   wherein generating the second encryption key for generating the authentication tag for the selected memory location comprises generating the second encryption key based on a second random number and the pointer value that is unique to the memory location and associated with the memory location, wherein storing the cipher text and authentication tag in the memory comprises storing the cipher text and authentication tag in the memory at the selected memory location, and wherein the first and second random numbers are different.

7. The method of claim 6, wherein generating the first encryption key comprises:
   determining the pointer value that is unique to the memory location and associated with the memory location;
   transforming the pointer value using a known algorithm to generate a transformed pointer value; and
   combining the transformed pointer value with the first random number to generate the first encryption key.

8. The method of claim 7, wherein combining the transformed pointer value with the first random number to generate the first encryption key comprises combining the transformed pointer value with the first random number and a master key value to generate the first encryption key.

9. The method of claim 6, further comprising generating the first and second random numbers, wherein generating the first and second random numbers comprises generating the first and second random numbers that are each at least one of unique to a power-up cycle of a system comprising the memory or based on a time at which the data to be stored by the memory at the selected memory location is written to the memory.

10. The method of claim 1, wherein:
    encrypting the data using the second encryption key generates the authentication tag that is the same size as the cipher text; and
    storing the cipher text and authentication tag in the memory comprises storing the cipher text and authentication tag in the memory in memory blocks of the same size.

11. The method of claim 6, further comprising:
decrypting the cipher text and the authentication tag stored by the memory at the selected memory location, wherein decrypting the cipher text and the authentication tag comprises:
determining the first and second random numbers;
determining the pointer value that is unique to the selected memory location;
generating a first decryption key by at least combining the first random number with the pointer value;
generating a second decryption key by at least combining the second random number with the pointer value;
decrypting the cipher text stored by the memory at the selected memory location using the first decryption key to generate first plaintext; and
decrypting the authentication tag stored by the memory at the selected memory location using the second decryption key to generate second plaintext; and
authenticating the cipher text retrieved from the memory, wherein authenticating the cipher text retrieved from the memory comprises comparing the first and second plaintext.

12. A system comprising:
a key generation module configured to generate a first encryption key for encrypting data to be stored by a memory at a selected memory location and generate a second encryption key for encrypting the data to be stored by the memory at the selected memory location, wherein generating the second encryption key is not based on the first encryption key, and wherein generating the first encryption key is not based on the second encryption key;
an encryption and decryption module configured to encrypt the data using the first encryption key to generate cipher text that is decryptable back into the data using the first encryption key and encrypt the data using the second encryption key different than the first encryption key to generate an authentication tag that is decryptable back into the data using the second encryption key;
the memory configured to store the cipher text and the authentication tag; and
a processor configured to authenticate the contents of the memory by at least controlling the encryption and decryption module to decrypt the cipher text to generate first plaintext and decrypt the authentication tag to generate second plaintext, and comparing the first and second plaintext.

13. The system of claim 12, wherein the encryption and decryption module comprises:
a first encryption and decryption module configured to encrypt the data using the first encryption key to generate the cipher text; and
a second encryption and decryption module configured to encrypt the data using the second encryption key to generate the authentication tag.

14. The system of claim 12, wherein the processor is configured to control the encryption and decryption module to decrypt the cipher text and authentication tag in parallel.

15. The system of claim 12, wherein the processor is configured to control the encryption and decryption module to decrypt the cipher text and authentication tag at different times.

16. The system of claim 12, wherein the processor is configured to determine, in response to comparing the first and second plaintext, that the first and second plaintext do not match, and, in response, generate a tamper indication.

17. The system of claim 12, wherein the memory comprises a plurality of memory locations each associated with a respective unique pointer value, and wherein the processor is configured to select the memory location of the plurality of memory locations to which the data is to be written, wherein the key generation module is further configured to generate the first and second encryption keys based on a respective one of first and second random numbers and the unique pointer value associated with the selected memory location, the first and second random numbers being different.

18. The system of claim 17, wherein the processor is configured to store the cipher text and authentication tag in the memory at the selected location and the processor is configured to decrypt the cipher text stored by the memory at the selected memory location by at least determining the first and second random numbers, determining the unique pointer value associated with the selected memory location, controlling the key generation module to generate a first decryption key by at least combining the first random number with the pointer value and controlling the key generation module to generate a second decryption key by at least combining the second random number with the pointer value, and controlling the encryption and decryption module to decrypt the cipher text stored by the memory at the selected memory location using the first decryption key to generate the first plaintext and decrypt the authentication tag stored by the memory at the selected memory location using the second decryption key to generate the second plaintext, wherein the processor is further configured to authenticate the cipher text retrieved from the memory by at least comparing the first and second plaintext.

19. The system of claim 17, wherein the key generation module is configured to generate the first encryption key by at least transforming the unique pointer value associated with the selected memory location and combining the transformed pointer value with the first random number and a master key value.

20. A non-transitory computer-readable storage medium comprising instructions that upon execution cause a processor to:
control a key generation module to generate a first encryption key for encrypting data to be stored by a memory at a selected memory location and generate a second encryption key for encrypting the data to be stored by the memory at the selected memory location, wherein generating the second encryption key is not based on the first encryption key, and wherein generating the first encryption key is not based on the second encryption key;
control an encryption and decryption module to encrypt the data to be stored by the memory using the first encryption key to generate cipher text that is decryptable back into the data using the first encryption key;
control the encryption and decryption module to encrypt the data to be stored by the memory using the second encryption key different than the first encryption key to generate an authentication tag that is decryptable back into the data using the second encryption key;
store the cipher text and authentication tag in the memory; and
after storing the cipher text and authentication tag in the memory, retrieve the cipher text and authentication tag from the memory and authenticate the retrieved cipher text, wherein the instructions cause the processor to authenticate the retrieved cipher text by at least:

controlling the encryption and decryption module to decrypt the cipher text using the first encryption key to generate first plaintext;

controlling an encryption and decryption module to decrypt the authentication tag using the second encryption key to generate second plaintext; and comparing the first and second plaintext.

* * * * *